US012619222B2

(12) United States Patent
Mehmedagic

(10) Patent No.: US 12,619,222 B2
(45) Date of Patent: May 5, 2026

(54) VISUALIZATION OF LIFECYCLE INFORMATION AND MANAGEMENT FOR AN INDUSTRIAL NETWORK

(71) Applicant: Schneider Electric USA, Inc., Andover, MA (US)

(72) Inventor: Alen Mehmedagic, Wilmington, MA (US)

(73) Assignee: Schneider Electric USA, Inc., Boston, MA (US)

( * ) Notice: Subject to any disclaimer, the term of this patent is extended or adjusted under 35 U.S.C. 154(b) by 292 days.

(21) Appl. No.: 18/203,547

(22) Filed: May 30, 2023

(65) Prior Publication Data

US 2023/0384778 A1     Nov. 30, 2023

Related U.S. Application Data

(60) Provisional application No. 63/347,460, filed on May 31, 2022.

(51) Int. Cl.
    *G05B 19/418*          (2006.01)
(52) U.S. Cl.
    CPC ...  *G05B 19/41885* (2013.01); *G05B 19/4185* (2013.01)
(58) Field of Classification Search
    CPC .......... G05B 19/41885; G05B 19/4185; G05B 2219/32014; G05B 19/41855;
    (Continued)

(56) References Cited

U.S. PATENT DOCUMENTS

| 2003/0020764 A1* | 1/2003 | Germain | ................. H04L 43/00 |
| | | | 715/853 |
| 2017/0048144 A1* | 2/2017 | Liu | ....................... H04L 47/122 |

(Continued)

FOREIGN PATENT DOCUMENTS

| CN | 104504753 | * | 4/2015 | ............. G06F 17/30 |
| WO | 2019099088 A1 | | 5/2019 | |

OTHER PUBLICATIONS

Chadha, B., xViz Packed Bubble Chart, published May 11, 2020, downloaded from https://xviz.com/blogs/packed-bubble-chart-key-features-power-bi-visual/ (Year: 2020).*

(Continued)

*Primary Examiner* — Eric J Yoon
(74) *Attorney, Agent, or Firm* — Patterson + Sheridan, LLP

(57) ABSTRACT

Apparatuses, systems, and methods for providing enhanced visualization of lifecycle information and management for a network, such as an industrial network, enable the creation/design of a virtualized network. The virtualized network eases the physical deployment/installation of a real network by using augmented reality (AR) to enable configuration/monitoring of the network using the virtualized network and real-time and/or historical information. Performance issues may be identified and visually conveyed to a user using AR overlay. The virtualized network may be created by a user via a network layout creation tool that combines both physical and logical mappings of devices and elements. One or more AR tools may be used to add, edit, remove, and/or manipulate elements of the network model using gestures. The virtualized network may be implemented as a digital twin of the location and used to assist in the physical deployment, maintenance, and monitoring of a network at the location.

19 Claims, 15 Drawing Sheets

(58) Field of Classification Search
CPC .... H04L 41/122; G06F 3/011; G06F 3/04817;
G06F 3/0482; G06T 19/006
See application file for complete search history.

(56) References Cited

U.S. PATENT DOCUMENTS

| | | | |
|---|---|---|---|
| 2017/0277171 A1 | 9/2017 | Asenjo et al. | |
| 2020/0336707 A1* | 10/2020 | Schmirler | H04N 7/181 |
| 2021/0021492 A1 | 1/2021 | Gao et al. | |

OTHER PUBLICATIONS

Search Report and Written Opinion for App. No. PCT/US2023/023901 dated Sep. 8, 2023, 11 pages.
Search Report and Written Opinion for International Application No. PCT/US2023/023901 dated Sep. 8, 2023, 11 pages.

* cited by examiner

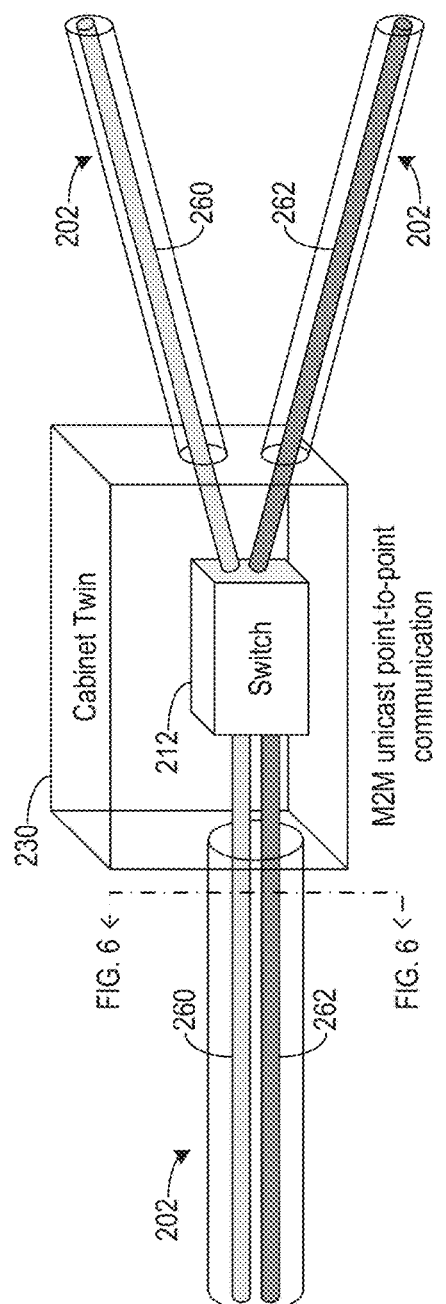
FIG. 2C
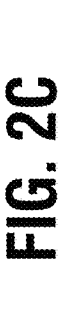
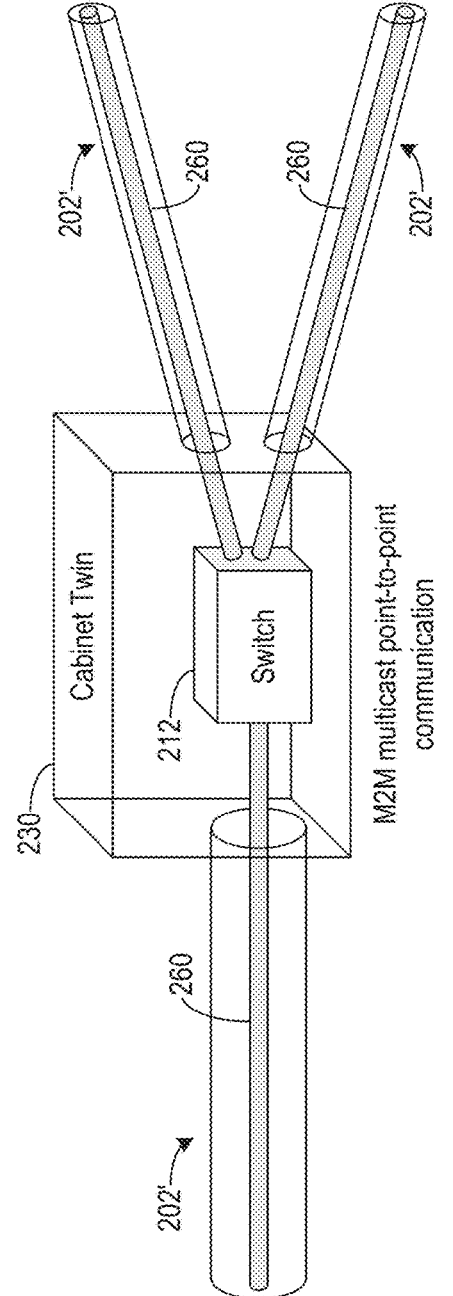
FIG. 2D

400

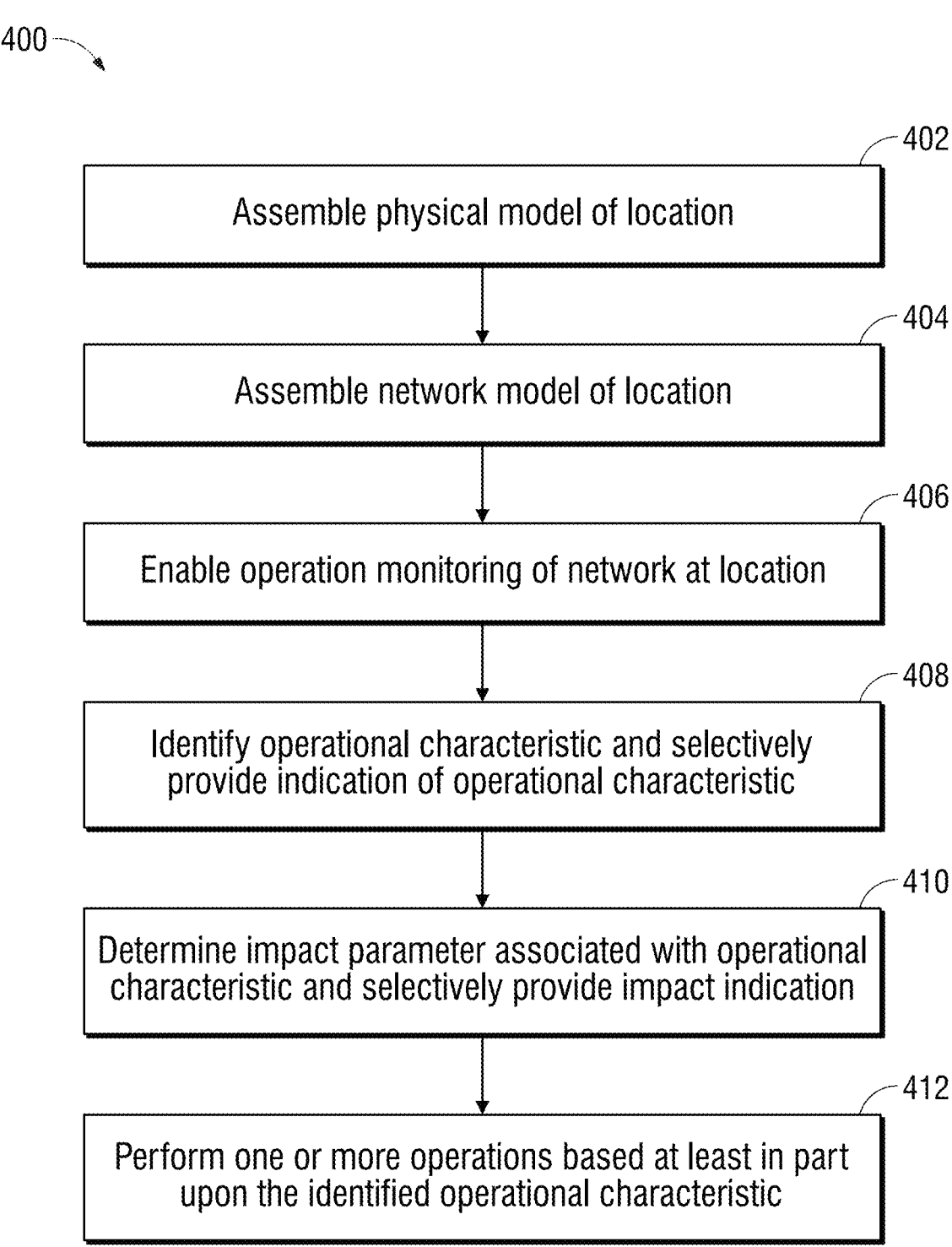

402

Assemble physical model of location

404

Assemble network model of location

406

Enable operation monitoring of network at location

408

Identify operational characteristic and selectively provide indication of operational characteristic

410

Determine impact parameter associated with operational characteristic and selectively provide impact indication

412

Perform one or more operations based at least in part upon the identified operational characteristic

VISUALIZATION OF LIFECYCLE INFORMATION AND MANAGEMENT FOR AN INDUSTRIAL NETWORK

CROSS-REFERENCE TO RELATED APPLICATIONS

This application claims the benefit of priority to and incorporates herein by reference U.S. Provisional Application No. 63/347,460, entitled "Apparatuses, Systems, and Methods for Providing Visual Lifecycle Information for an Industrial Network," filed May 31, 2022.

TECHNICAL FIELD

The present disclosure relates to providing visual indicia of elements, and more particularly to providing visual lifecycle information for industrial networks.

BACKGROUND

Conventional industrial networks contain complex configurations to both physical and virtual elements. As networks become even more complex, the already elevated requirements for software management systems to manage and control industrial networks become even greater over time. For example, it is hard to visualize information flow in the day-to-day operation in a factory. It is hard also to visualize actual (e.g., geophysical world) deployment of the network at facilities. Most identification of physical locations is done through extensive schematics and network specialized software. For example, there are individual network-centric software solutions which mostly operate in the two-dimensional (2D) world (such as schematics) and which are isolated from the industrial automation process. However, combining individual network-centric software solutions with the industrial automation process is quite an engineering feat, one that requires extensive tool expertise.

SUMMARY

Provided herewith are apparatuses, systems, and methods for providing enhanced visualization of lifecycle information and management for a network, such as an industrial network. Implementations consistent with the present disclosure may provide industrial automation users with a comprehensive and global network management toolset. The toolset can provide efficient network creation, installation, configuration, operation, diagnostics, and repair on a global multi-plant scale. Implementations consistent with the present disclosure, such as one or more network expert tools (e.g., an EcoStruxtureNetwork expert by Schneider Electric) are capable of providing a software/hardware system for ease of creation, installation, configuration, operation, diagnostic analysis, and repair of networks through the use of enhanced visualizations and Augmented Reality (AR) concepts. Various levels of industrial plant personnel may be enabled to interact and see a network in a three-dimensional (3D) form and may be permitted to overlay its flows onto one or more plant processes. This may be achieved by combining data models and information flows of a cyberworld with the geophysical world.

According to aspects of the present disclosure, apparatuses, systems, and methods may enable the creation/design of a network layout (e.g., for an industrial plant or other location), may ease the physical deployment/installation of the network (e.g., using AR by an installer using the network layout), and may enable configuration/monitoring of the network using the network layout, real-time and/or historical information, and AR visualization of the network and network information. One or more performance issues or parameters may be identified and visually conveyed to a user, for example using AR overlay. The network layout may be created by a user via a network layout creation tool which combines both physical and logical mappings of devices and elements. This may be accomplished, for example, in a 3D model or cyberworld, such as a metaverse. One or more AR tools may be used to add, edit, remove, or manipulate at least one device or element of the network model created using the tool. This may include the use of one or more gestures to perform such functionality. The network model may be implemented as a digital twin of the location, which may be used to assist in the physical deployment, maintenance, and monitoring of the network at the location.

A plant or other location may be assembled through a virtual location (e.g., factory) builder where all elements can be acquired first as a digital twin followed by a physical embodiment, model, or actual thing. With use of AR aids such as vision input (e.g., via glasses, cameras, monitors, or electronic device) and controllers (e.g., gloves, body suits, or other input or capture element), industrial automation personnel may be placed into an augmented factory AR world where they can assemble a network using gestures and physical interaction, and may immediately see the results of these actions leading toward an operational system. Operational systems can be monitored in the physical world with an overlay of the networking elements (e.g., using AR) to watch information flowing from one element of the location to another where physically invisible elements are projected as digital twins. Errors/reductions in performance (e.g., performance parameter(s)) may be visually indicated and geophysically positioned so that immediate reaction is possible. As it is a holistic view of the network, its impact on an entire process can be visualized and the network can be repaired accordingly such that the process can be resumed.

Implementations consistent with the present disclosure (e.g., using the EcoStruxtureNetwork expert) in combination with one or more other Industrial Automation (IA) tools may combine to bring user-oriented 3D visualization of a network from its conception throughout its lifecycle with the aid of digital twin concepts and AR to provide a personalized user experience. This approach moves user interface (UI) implementation from the network engineering domain into the IA domain. In accordance with aspects of the present disclosure, each individual in a plant or location may be able to customize and visualize network lifecycle and/or information flow(s) of automation process information throughout the plant or location (or subset thereof).

One or more elements in accordance with the present disclosure may include, either alone or in combination: a) real-time visualization of information flow through the network and connected machines devices with overlay over actual industrial process; b) on-site visual network management consisting information on network devices functions and physical location even in concealed environments; c) view customizations levels based on the personnel type that is interacting with the network and information they require; d) network construction in virtual shop brings the feeling of immersed experience with superior technical support; and/or e) information-driven network management throughout an entire network life cycle.

Implementations consistent with the present disclosure may include software and/or hardware implementations which can enable multifaceted views of a network which may be supplemented with AR. This may include network lifecycle information and operations, including creation, installation, configuration, operation, diagnostic, and repair. Network users may include: engineers, installers, operators, maintenance technician, and business personnel, amongst others. For example, an operator or network engineer during plant operation can visualize one or more operations of the network. The present disclosure provides insight in network lifecycle and use of visualization methods and technologies to provide an immersive and interactive user experience throughout a network lifecycle.

Creation of the network may be viewed as an engineering process. Use of a network may be determined based at least in part upon an application that the network serves. For example, for an industrial automation, machine and digital plant applications may be used.

Digital twins may be used to provide a full simulation of a machine through the use of virtual reality complemented with AR visualization. The level of detail of digital twin may determine a level of integrability into an IA solution. For this reason, it is conceivable to see that all networked parts of a machine may be modeled (or subset(s) thereof), and their physical characteristic(s) can be described, as well as the network digital twin. Open Platform Communications Unified Architecture (OPCUA) defines a model of describing the physical and logical assets at part 80-84 of OPCUA for Field Exchange (OPCUAFX) and this description is intended to be compatible with the approach and definition of networking needs.

Implementations consistent with the present disclosure may take into account location of the system(s) and associated parts and may provide mapping of a cyber description to a real physical installation. For network creation, switches (e.g., bridges) that have one or more physical characteristic(s) suitable for the environment may be identified. One or more suitable characteristic(s) may relate to size, power consumption, port count, temperature, electrical ratings, connectivity types (e.g., wireless vs wired, etc.), and/or other switch characteristic(s). Switches may be selected by a user through a connection to a digital marketplace (e.g., a Schneider Electric marketplace or any other authorized equipment vendor). A distance between the devices using information from a facility layout system may be provided. The system may include an ability to visually differentiate logical vs. physical connectivity paths. The system may further include an ability to visualize a wireless radius (e.g., WiFi or 5G) of devices and layer them out over a facility/housing layout. In some instances, design may be accomplished in a 3D cyberworld, for example as deployed using the metaverse concept from Meta Platforms, Inc. One characteristic of implementations consistent with the present disclosure is that gestures may be used to create devices and to connect them based upon an information model provided by a device manufacturer. Furthermore, purchase forms and delivery locations are capable of being automatically filled and placed through connection to inventory subsystem. Similarly, work orders for physical wiring and deployment can be generated with detailed instructions. This may include cable quality, bending requirements, distance (e.g., Ethernet, Single Pair Ethernet (SPE), Ethernet Advanced Physical Layer (APL), etc.), type of fiber (e.g., all types) vs. copper (with CAT ratings including SPE (Single Pair Ethernet), etc.).

Implementations consistent with the present disclosure may provide an intelligent network system which is capable of translating IA needs into those of a network. An example of an advantage of implementations consistent with the present disclosure includes visualization of these connections and information flows by utilizing features of Industrial devices (e.g., it can use OPCUA information models and CNC Yang models in combination supplemented with geophysical information form the facility to create global overview of the network). Systems described herein may be capable of representing visual utilization of the network through various methods and may be based at least in part upon user intent, One or more paths from particular entities exchanging data may be selectively highlighted, for example using a visual cross-section of a link. Bandwidth utilization may be quantified by manipulating a width and/or intensity of a connection representation tied with a link cross-section view. For example, a cross-section size may be proportionately sized according to an available bandwidth (e.g., 10 Megabit (Mb), 100 Mb, 1 Gigabit (Gb), etc.). Each connection may be selectively visualized through use of OPCUA PubSub (including, but not limited to Unified Architecture Datagram Protocol (UADP), User Datagram Protocol (UDP), and OPCUA Ethernet), Transmission Control Protocol (TCP)/UDP, Internet Protocol (IP), Media Access Control (MAC), Virtual Local Area Network (VLAN), Priority Code Point (PCP), stream utilization, and/or any other relevant network information. Implementations consistent with the present disclosure may make use of any communication protocol defined in one or more standards having data or metadata that can be visualized, mapped, and selected. Presence of the protocol(s) may be detected, for example, according to issuing device information and/or by capturing content of the network in real-time. Devices which perform data capturing (e.g., Ethernet taps) and processing and protocol identification software may be used. Such devices may be integrated into systems consistent with the present disclosure or may be utilized if they are part of a device switch or CNC to identify a profile and to generate stream/flow information.

A distance may be visualized by merging physical (or logical) distance with network latency information, for example where latent information appears to be far away. One or more visualizations may be provided to select a set of flows, for example based at least in part upon one or more of (a) applications: such as web, real time process, engineering tools, industrial automation management connections etc. applications; (b) user profiles: such as machine operators, network engineer, production engineer, and/or any subset of IA application development; (c) network technologies and network isolation and segregations: such as TSN (PTP) domains, IP networks, VLANs and Virtual Extensible LANs (XVLANs) etc.; and/or (d) total bandwidth availability by speed of the network (e.g., 10 Mb, 100 Mb, 1 Gb, etc.). With the availability of full virtualization and Network Functions Virtualization (NFV), an entire system can be simulated before deployment in various embodiments. Automatic or manual topology management based on data provided by equipment vendors may be provided.

Many concepts described herein can be made available even without 3D virtualization (e.g., a metaverse), for example using a current schematic view. Ordering of selected network switches is feasible given that current network management software has the ability to do so. Use of 3D visualization according to aspects of the present disclosure may enable an immersive experience and potential simulation of installation procedures with evaluation and training of personnel.

As machines are usually closed systems, operators cannot see inside them nor can they see how information flows between them or within the machines (i.e., their internal network). With the aid of one or more elements of the present disclosure, a user may be able to visualize physical equipment on the floor of a location such as a plant, together with internal and external information flow information. Implementations consistent with the present disclosure may enable visualization of one or more machines and its digital twin with network infrastructure. Visualization may be scalable and can be zoomed in and out, bringing remote access and larger system configurations in foreplan combined with geolocation. For example, a configuration of two machines and corresponding infrastructure device(s) located in secure equipment cabinet may be visualized.

An IA application designer is able to select available data from a device/machine and to connect it to another machine or upper layer management system(s), for example using one or more gestures. Concepts such as OPCUA connection management may be utilized as technological layer for connection provisioning. As the scaling grows, inter-plant communication can be visualized in a similar manner and may be presented at a correct user interest and/or permission level. With full immersion of application design, distinct lines in the lifecycle of network devices are slightly blurred. As a system is selected rather than programmed, some of the design phase features may blend with installation and operation phases.

Once a network is designed in the IA metaverse it can be deployed in the physical world using AR with the aid of artificial intelligence (AI). Real network devices may be procured from vendors and be delivered to installation locations together with connection cabling. Simply by using AR tools such as glasses or other electronic devices, installation personnel can install and connect the devices per industrial metaverse simulation and a detailed plan laid out in the creation phase. Naturally, not everything in the real-world occurs according to plan, therefore deficiencies in the installation stage can be automatically detected and reported to engineering for correction (which can be done immediately by sharing of user AR space) according to aspects of the present disclosure.

Network devices can be scanned and physical information such as model numbers and/or serial numbers can be integrated into the network digital twin, making it a complete representation of the device(s) and enabling secure deployment.

A plurality of possible services may be available during an installation stage. For example, (a) verification of physical and logical assets of the network with the aid of artificial intelligence (AI)-based image recognition, optical character recognition (OCR), bar or quick response (QR) code, near-field communication (NFC) tags, and other sources of information or combination(s) thereof; (b) geophysical location of the networked devices with realistic distance measurement (e.g., active cable length determination), which may be augmented with Global Positioning System (GPS) positioning and signal triangulation of existing wireless (e.g., WiFi or 3G, 4G, or 5G devices) or by any other method of determining a physical location; (c) cybersecure commissioning based on installation work orders and schedules together with device and personnel authentication; and/or (d) real-time verification of installation by matching with a network global view in an IA metaverse (for example, while connecting cables a proper port can be highlighted and a description of the cable can be provided or even matched to the cable packaging). If devices are active immediate feedback on the neighboring device can be provided and verified as well. Indeed, with respect to (a) above, implementations consistent with the present disclosure may use AI based image recognition to compare a real world image to an image on file, and textual information can be compared to specifications on file.

Implementations consistent with the present disclosure may leverage virtualization technologies and broad ideas as well as augmentation devices (e.g., Microsoft HoloLens, Google glasses, Oculus rift etc.) with supporting software hosting and integration platforms (e.g., Amazon Web Services (AWS), Microsoft Azure, Google cloud), network management tools (e.g., open daylight and/or vendor-specific network management tools), OPCUAFX information models, YANG models, etc., as well as AI based platforms for audio and video processing and human interaction, such as language processing (e.g., via chatGPT, DeepMind, or other AI platform), either alone or in combination(s). However harvesting the information is currently difficult and vision of integration in industrial world is quite lacking. To resolve this and other problems, implementations consistent with the present disclosure may harvest technology advances and combine them into a new and novel industrial automation system that can deliver ease of use as a benefit to end users.

In various embodiments, it may be possible to provide one or more security (e.g., cybersecurity) services or operations according to aspects of the present disclosure. For example, one or more devices or machines, (e.g., an unauthorized device and/or suspicious traffic associated therewith) may be identified and visualized to a user, for example via an electronic device. An AR mapping of the device or traffic flow may be presented in an augmented view, and the user may be permitted to provide one or more gestures to modify one or more connections or configurations of the network and/or device to stop or prevent harm or risk, such as by permitted the user to provide a gesture which disables communications to/from the device (e.g., by disabling one or more network ports to prevent communications). This may be performed remotely from the device, without requiring immediate physical access to a device, such as when the device is inside of a machine or cabinet.

According to aspects of the present disclosure, provided is a method for visualizing an industrial network. In various embodiments, the method may include assembling a model of a plant associated with the industrial network through a virtual factory builder where elements (e.g., all elements or portion thereof) of the plant can be acquired first as digital twin followed by a physical embodiment, model, or actual thing. A model of the industrial network may be assembled based, at least in part, upon recorded input from one or more system users. The recorded input may include gestures and/or physical interactions of the system users indicating various elements, characteristics (e.g., locations, device types, etc.), and/or configurations of the industrial network. Monitoring of operation(s) of the industrial network may be presented via a visual interface (e.g., augmented reality of a monitoring and control system presented on an electronic device) by overlaying information from, or derived from, the assembled model of the industrial network onto information from, or derived from, the assembled model of the plant, wherein information flowing from one element of the plant to another in shown in the visual interface. Parameters such as errors or reductions in performance of the industrial network may be identified and/or visually indicated in the visual interface. The parameters (e.g., errors and/or reductions in performance) of the industrial network may be geophysically positioned and/or indicated in the visual interface so that immediate reaction is possible. Methods may include identifying and selectively visually indicating impact of the identified parameters (e.g., errors and/or reductions in performance) of the industrial network on one or more processes associated with the plant in the visual interface. One or more actions may be taken to address the identified errors/reductions in performance of the industrial network. The one or more actions may include providing at least one recommendation for addressing the identified parameters (e.g., errors and/or reductions). The one or more actions may be automatically identified and initiated in various embodiments. The one or more actions may be taken to reduce or eliminate the impact of the identified parameters (e.g., errors and/or reductions in performance) on the one or more processes associated with the plant.

According to further aspects of the present disclosure, provided is a method for visualizing an industrial network. The method may include assembling a plant model of a plant associated with the industrial network, assembling a network model of the industrial network, enabling monitoring of operation of the industrial network, identifying at least one performance parameter of the industrial network, identifying an impact of the at least one performance parameter in relation to the industrial network on one or more processes, selectively visually conveying the at least one performance parameter via an overlay of the industrial network at a user interface, and/or taking one or more actions to address the at least one performance parameter. Visually conveying the at least one performance parameter may include providing an augmented reality overlay depicting the at least one performance parameter on or along one or more elements of the plant model. Visually conveying the at least one performance parameter may include providing an augmented internal view of at least one device of the industrial network. Visually conveying the at least one performance parameter may include visually conveying one or more real-time or expected communication flows or statuses.

According to still further aspects of the present disclosure, provided is a method for providing services for a network. The method may include creating a location model and a network model associated with the location model, deploying at least a portion of a network according to the location model, selectively modifying the location model as part of the deploying the at least a portion of the network, obtaining information associated with the at least a portion of the network, determining a performance parameter associated with the at least portion of the network, and/or visually conveying the performance parameter in relation to the location model and the network model.

According to further aspects of the present disclosure, provided is a system for providing services for a network. The system includes a location modeling module configured to obtain device information for the network and to create a location model, a storage configured to store the location model, an electronic device configured to visually convey information in relation to the location model, and further configured to permit a user of the electronic device to manipulate at least a portion of the location model, and a monitoring module configured to obtain information relating to the network and to identify at least one performance parameter associated with the network. The electronic device may visually convey a representation of the at least one performance parameter in relation to the location model.

In general, in one aspect, embodiments of the present disclosure relate to a system for monitoring an industrial network for a plant associated with the industrial network. The system comprises, among other things, a physical model builder configured to assemble a model of the plant by acquiring digital representations associated with the plant, each digital representation corresponding to a physical network element associated with the plant. The system also comprises a network model builder configured to assemble a model of the industrial network by identifying network connections between two or more of the digital representation. The system additionally comprises a visualization module configured to create a virtualization of the industrial network based on the model of the plant and the model of the industrial network and present at least a portion of the virtualization of the industrial network on an electronic device. The system further comprises a network operation monitor configured to acquire information regarding operation of a portion of the industrial network corresponding to the portion of the virtualization of the industrial network presented on the electronic device, and overlay the information on the portion of the virtualization of the industrial network in a graphical format. The visualization module is further configured to receive, via the electronic device, a user gesture for a digital representation in the portion of the virtualization of the industrial network presented on the electronic device, and perform a function for the digital representation corresponding to the user gesture.

In general, in another aspect, embodiments of the present disclosure relate to a method of monitoring an industrial network for a plant associated with the industrial network. The method comprises, among other things, assembling a model of the plant by acquiring digital representations associated with the plant, each digital representation corresponding to a physical network element associated with the plant. The method also comprises assembling a model of the industrial network by identifying network connections between two or more of the digital representation, and creating a virtualization of the industrial network based on the model of the plant and the model of the industrial network and presenting at least a portion of the virtualization of the industrial network on an electronic device. The method additionally comprises acquiring information on operation of a portion of the industrial network corresponding to the portion of the virtualization of the industrial network presented on the electronic device, and overlaying the information on the portion of the virtualization of the industrial network presented on the electronic device in a graphical format. The method further comprises receiving, via the electronic device, a user gesture for a digital representation in the portion of the virtualization of the industrial network presented on the electronic device, and performing a function for the digital representation corresponding to the user gesture.

In general, in yet another aspect, embodiments of the present disclosure relate to an electronic device for monitoring an industrial network for a plant associated with the industrial network. The electronic device comprises, among other things, a processor and a storage communicatively coupled to the processor. The storage is configured to store computer-readable instructions thereon that, when executed by the processor, cause the electronic device to present at least a portion of a virtualization of the industrial network based on a model of the plant and a model of the industrial network and overlay information on operation of a portion of the industrial network corresponding to the portion of the virtualization of the industrial network presented. The computer-readable instructions, when executed by the processor, further cause the electronic device to receive a user gesture for a digital representation in the portion of the virtualization of the industrial network presented, wherein a function corresponding to the user gesture is performed for the digital representation in response to receiving the user gesture.

Numerous other objects, features, and advantages of the present invention will be readily apparent to those skilled in the art upon a reading of the following disclosure when taken in conjunction with the accompanying drawings.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

FIGS. 2C and 2D illustrate partial virtualizations of unicast and multicast communication path embodiments of a plant perspective of an implementation according to aspects of the present disclosure.

FIG. 4 illustrates a flowchart representing a method for providing visual lifecycle information and management for an industrial network according to aspects of the present disclosure.

Identical reference numerals have been used, where possible, to designate identical elements that are common to the figures. However, elements disclosed in one embodiment may be beneficially utilized on other embodiments without specific recitation.

DETAILED DESCRIPTION

As an initial matter, it will be appreciated that the development of an actual, real commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention.

Figure 1A:
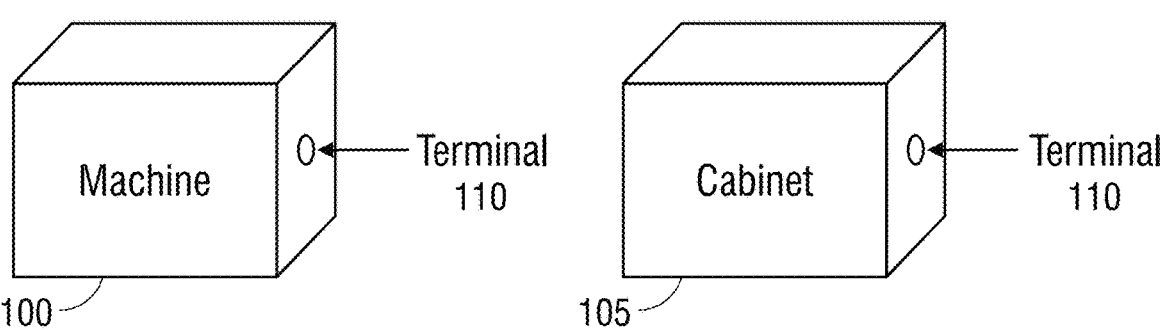
FIG. 1A illustrates a partial view of a simplified block diagram of a real view of an embodiment of a machine according to aspects of the present disclosure.

FIG. 1A illustrates an exemplary real machine 100 and a real cabinet 105 in simplified block diagram form according to aspects of the present disclosure. The machine 100 may be any device or equipment, for example, usable at a location (e.g., location 210) for one or more purposes. The cabinet 105 may be any equipment cabinet, for example, usable at a location (e.g., location 210) for housing networking devices or equipment. The machine 100 may include one or more elements, which may be included within the machine 100 or otherwise associated with the machine 100 (for example, as communicatively coupleable with the machine 100 while being located at a different physical location). The cabinet 105 may likewise include one or more elements, which may be included within the cabinet 105 or otherwise associated with the cabinet 105. The view of the machine 100 and the cabinet 105 in FIG. 1A represents a real-world view showing a closed system, whereby an operator cannot see inside at least a portion of the machine 100 or the cabinet 105, nor can the operator see how information flows between machine 100 and/or the cabinet 105, or elements thereof, and/or other entities, via one or more network interfaces or terminals 110 and 112 on each machine 100 and cabinet 105. One or more machines 100 may be installed at or installable at a location 210 (FIGS. 2A-2B) and may be part of a location model created using a location mapping tool, such as may be provided by a network expert tool, such as an EcoStruxtureNetwork tool by Schneider Electric of Boston, Massachusetts.

Figure 1B:
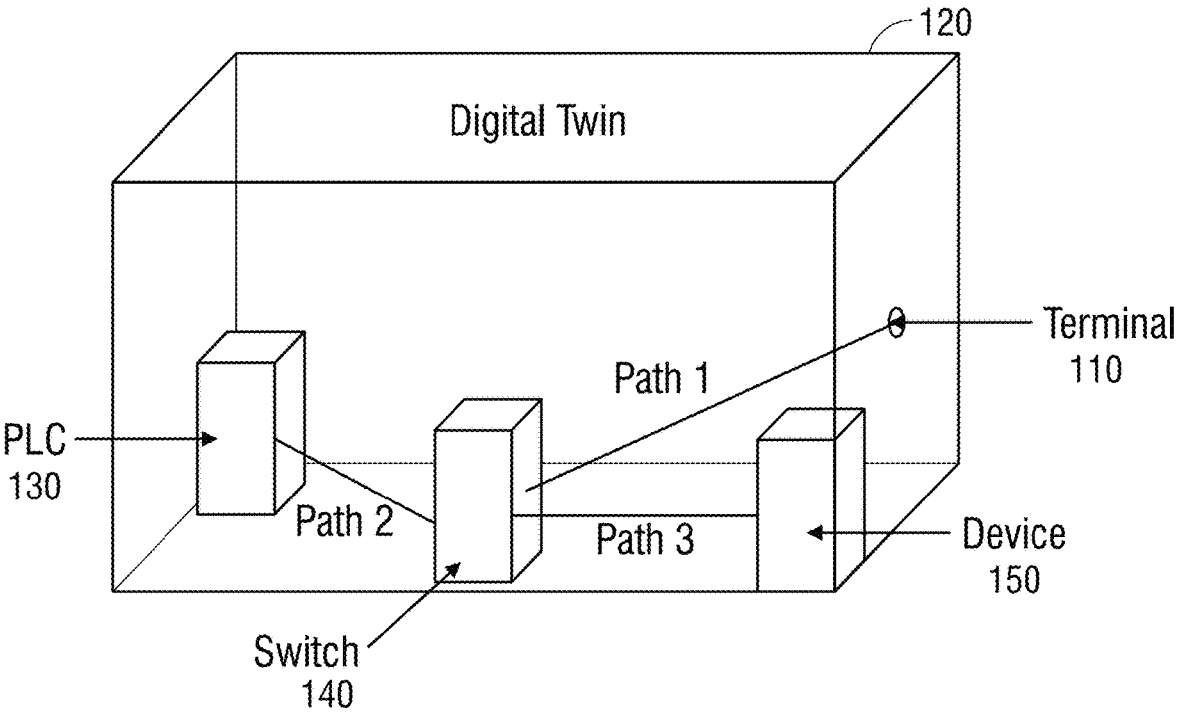
FIG. 1B illustrates a partial view of an embodiment of an augmented view of the machine of FIG. 1A according to aspects of the present disclosure.

FIG. 1B illustrates an exemplary AR visualization in simplified block diagram form for an exemplary digital twin 120 of the machine 100 of FIG. 1A according to aspects of the present disclosure. A digital twin is a digital representation of an intended or actual real-world physical product, system, or process that serves as the (effectively) indistinguishable digital counterpart of the physical twin for practical purposes, such as simulation, integration, testing, monitoring, and maintenance. The digital twin 120 may be used to virtualize and selectively visualize the machine 100, either in whole or in part. The digital twin 120 may be used alone or in part with one or more toolsets to enable visualization (e.g., Augmented Reality (AR) visualization) of physical equipment associated with a location such as location 210, together with internal and/or external information flow which may be associated with one or more machines 100 or elements thereof, as described further herein. The visualization may enable or permit installation of one or more machines 100 and/or associated machine(s), device(s), or elements, both in terms of physical and logical configurations.

The digital twin 120 of the machine 100 may include one or more components associated with the machine 100, including, for example, a Programmable Logic Controller (PLC) 130, a switch 140, a device 150, or any combination thereof. Although illustrated with one each of the PLC 130, switch 140, and device 150, it should be appreciated that all or none or more than one of these elements may be associated with the machine 100 in various embodiments, and that the machine 100 may have additional elements not depicted in FIG. 1B without departing from the spirit and scope of the present disclosure.

The terminal 110, PLC 130, switch 140, and/or device 150 of the digital twin 120, and as illustrated in the example, may be communicatively coupleable via one or more paths (e.g., as illustrated, for example with reference to Path 1, Path 2, and Path 3 of FIG. 1B). The one or more paths (or subset thereof) may be implemented as a physical wire or internal bus connection between components. Additionally or alternatively, one or more paths may be implemented at least in part via wireless communications in various embodiments. In various exemplary embodiments, the digital twin 120 may be capable of visual conveyance to a user, for example via a display of an electronic device 320 as described herein. Visualization of the digital twin 120 may be scalable and can be zoomed in and out and may permit remote access and larger system configurations in a floorplan combined with geolocation.

Figure 2A:
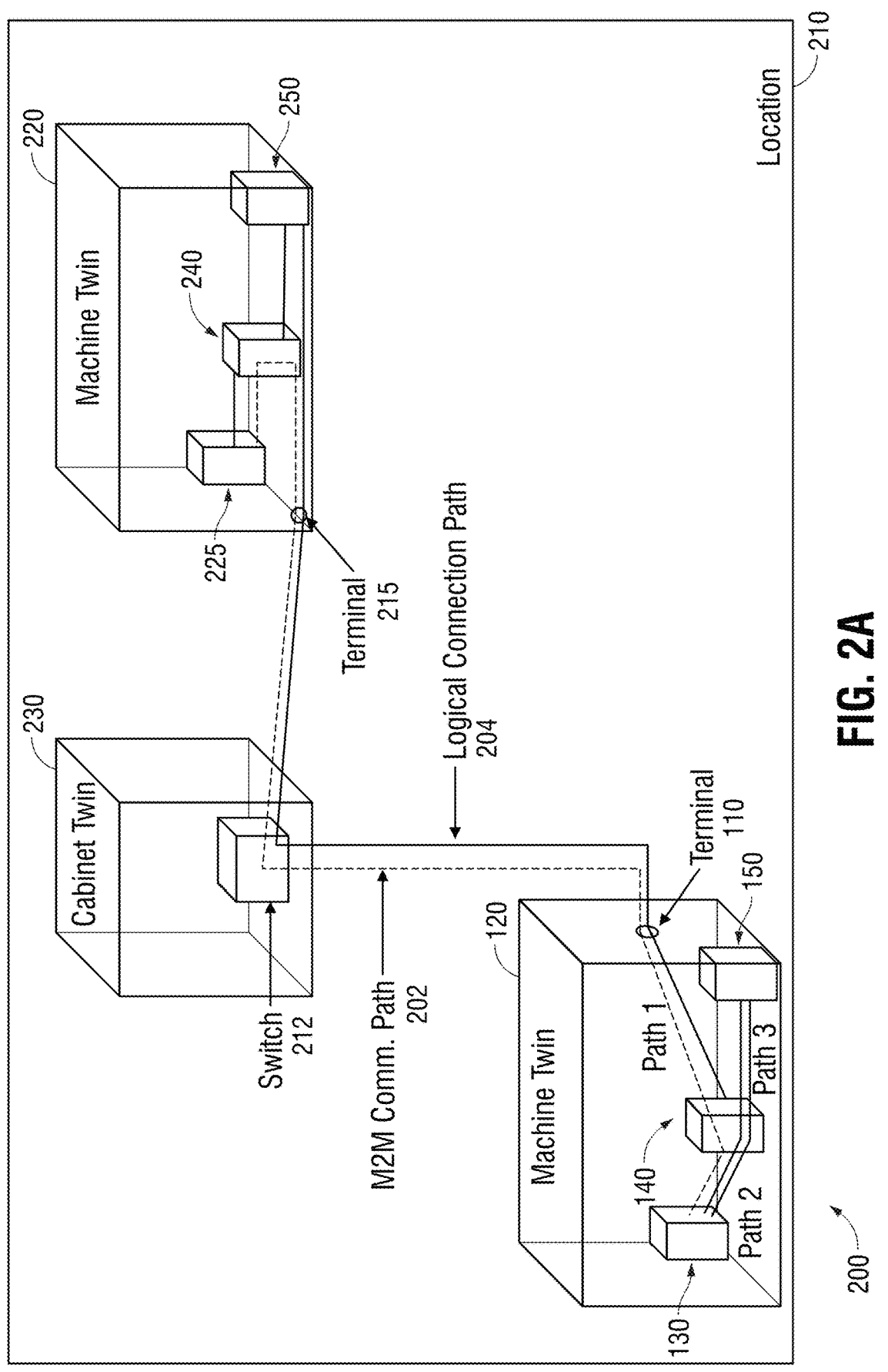
FIG. 2A illustrates a partial block diagram of a unicast embodiment of a plant perspective of an implementation having two machine twins and a cabinet twin according to aspects of the present disclosure.

FIG. 2A illustrates an exemplary AR visualization in simplified block diagram form partially showing a system 200 at a location 210, such as a particular area within, for example, a facility or plant, having machine digital twins and an equipment cabinet digital twin according to aspects of the present disclosure. The system 200 at the location 210 includes a machine digital twin 120 coupled to a cabinet digital twin 230 which is further coupled to a machine digital twin 210, each via one or more wired and/or wireless communication paths. In some embodiments, the machine digital twin 220 is a digital twin of a second machine 100. Thus, similar to the machine digital twin 120, the machine digital twin 220 may include a network interface or terminal

215 and one or more of an industrial controller 225, a switch 240, a device 250, or any combination thereof. The industrial controller 225 may be a distributed control system (DCS), programmable logic controller (PLC), or even an industrial PC. Also, although illustrated with one each of the PLC 225, switch 240, and device 250, it should be appreciated that all or none or more than one of these elements may be associated with the second machine 100 in various embodiments, and that such a machine may have additional elements not depicted in FIG. 1B without departing from the spirit and scope of the present disclosure. The cabinet digital twin 230 may correspond to a secure, real equipment cabinet at the location 210. The embodiment illustrated by FIG. 2A provides an example of a configuration of a location 210 having two machines 100 and a plurality of infrastructure devices, for example, located at a secure equipment cabinet.

A logical connection path 204 may be used to couple the machine twin 120 to the cabinet twin 230 and further to the second machine twin 220 corresponding to a second machine 100. The logical connection path 204 allows the machine twin 120, via the cabinet twin 230, to send/receive messages to/from the second machine twin 220. A logical connection via the logical connection path 204 may be implemented by Transmission Control Protocol (TCP), User Datagram Protocol (UDP), Open Platform Communications Unified Architecture (OPCUA), and/or any other protocol or architecture without departing from the spirit and scope of the present disclosure.

In accordance with aspects of the present disclosure, one or more of the connection paths at the location 210, such as the connection path 204 between the machine twin 120 and the second machine twin 220, may be selectively visualized via AR visualization. This visualization may be accomplished, for example, through the use of OPCUA (and compatible) protocols, including, but not limited to, Unified Architecture Datagram Protocol (UADP), UDP, and OPCUA Ethernet. A Machine-to-Machine (M2M) Communication path 202 may be provided between the PLC 130 of the machine twin 120 and the PLC 130 of the machine twin 220. Communications to/from the machine twin 120 and/or 220 may be provided, in whole or in part, by a network interface or terminal 110, as illustrated at machine twin 120 of FIG. 2A. One or more communication or connection paths 204 between the machine twin 120 and the machine twin 220 may be provided using one or more of switches 140, 240 of the machine twins 120, 220, respectively, and a switch 212 of the cabinet twin 230. Furthermore, a device 150 of the machine twin 120 may be logically coupled to the device 250 of the machine twin 220 via the logical connection path 204, which may also be configured to couple to one another via the switches 140, 240 of the machine twins 120, 220, respectively, and a switch 212 of the cabinet twin 230. The communication path(s) 204, the Machine-to-Machine (M2M) Communication path(s) 202, and other communication paths in the system 200 form a communication network, which may be an industrial communication network, for the facility or plant. As well, the one or more communication or connection paths 204 may be associated with a backup or redundant network for the facility or plant to provide network redundancy as needed.

In accordance with aspects of the present disclosure, a user, such as an Industrial Automation (IA) application designer, can select a device and/or machine like the machine 100 by selecting its digital twin 120 (e.g., by tapping on the visualization thereof). The designer can view the data and specifications for the device and/or machine. And the designer can connect the device and/or machine (e.g., using gestures) to another device and/or machine like the machine 100 via its digital twin 220 (or visualization thereof). The designer can also connect the device and/or machine (e.g., again using gestures) to an upper layer connection management system(s) via their digital twin(s) (or visualization(s) thereof). Connection management concepts such as those implemented by OPCUA as well as software defined networking (SDN) concepts implemented via logical entities such as a Centralized User configuration (CUC) and a Centralized Network Controller (CNC) in Time-Sensitive Networking (TSN), and similar types of connection management concepts may be utilized as a technological layer for connection provisioning in various embodiments. As scaling grows, inter-location (e.g., inter-plant) communication may be visualized in a similar manner and optionally presented at a correct user interest level (and optionally according to one or more permissions associated with a user and/or group). Furthermore, when the embodiments herein are combined with design applications, traditionally distinct lines in the lifecycle of network devices become less distinct. For example, when a system is selected from available systems rather than programmed during the design phase, some of the design phase features may blend with installation and operation phases of the lifecycle.

Note that although reference is made herein to "digital twins," embodiments of the present disclosure are not limited to digital twins, but more generally encompasses any type of digital representation of a device and its functions. Thus, for example, the network devices herein may also be acquired and/or constructed via device data sheets available from device manufacturers, which may be part of or separate from the device's digital twin. Accordingly, embodiments of the present disclosure that reference a device's digital twin are equally applicable to the device's digital representation, which may be part of or separate from the device's digital twin.

Figure 2B:
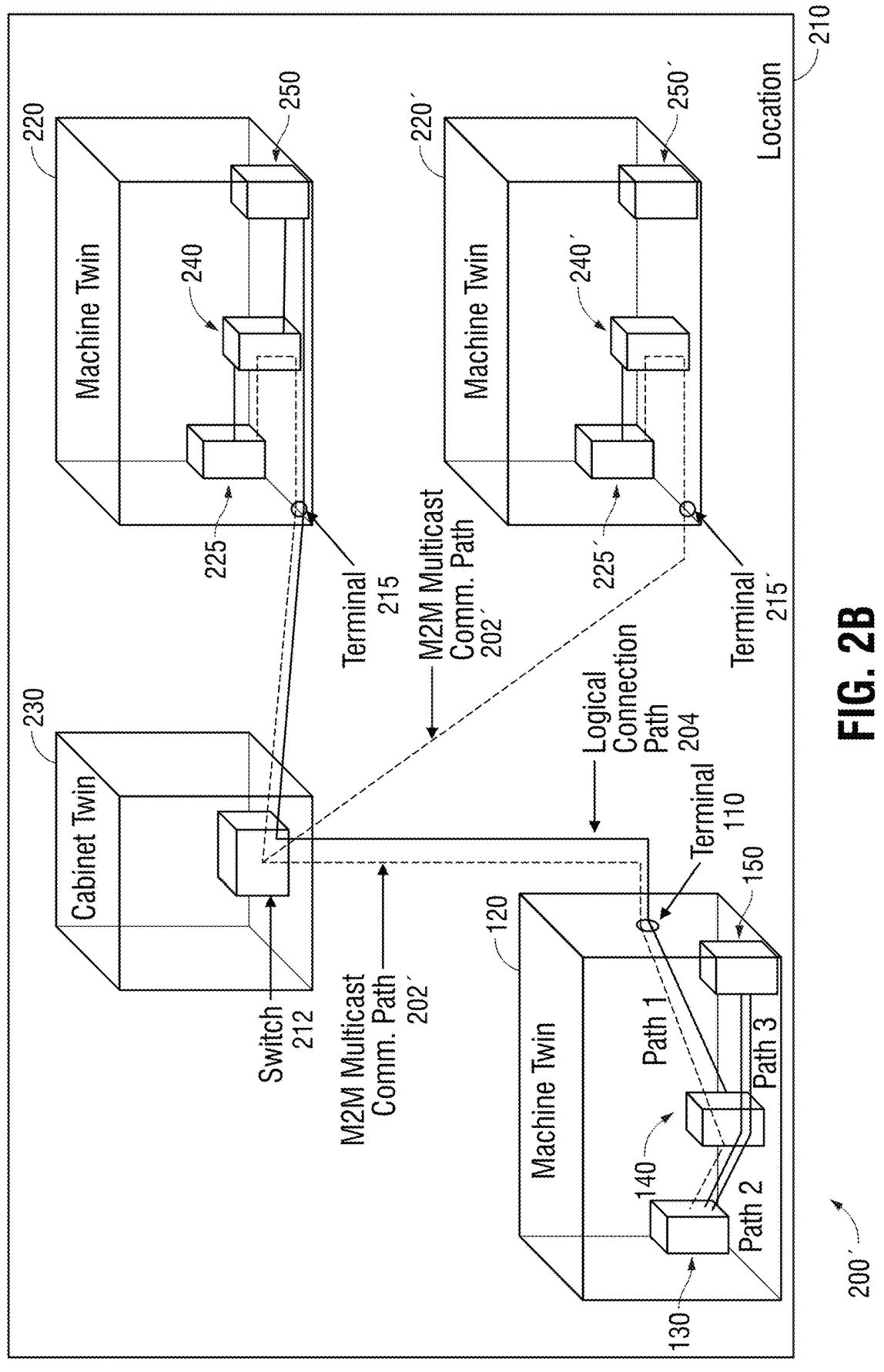
FIG. 2B illustrates a partial block diagram of a multicast embodiment of a plant perspective of an implementation having two machine twins and a cabinet twin according to aspects of the present disclosure.

Additionally, in some embodiments, such as depicted in FIG. 2A above, the M2M communication path provided between the PLC 130 of the machine twin 120 and the PLC 130 of the machine twin 220 may carry unicast point-to-point communications, while in other embodiments, such as illustrated in FIG. 2B, the M2M communication path may carry multicast point-to-point communications.

Referring to FIG. 2B, a partial AR virtualization is again shown in simplified block diagram form partially depicting a system 200' at the location 210. The system 200' is similar to the system 200 from FIG. 2A insofar as there is a machine twin 120, a cabinet twin 230, and a second machine twin 220, each equipped with similar components as their counterparts from FIG. 2A. Additionally, at least one additional machine twin 220' is present in the system 200' that has similar components as the second machine twin 220, including an industrial controller 225', a switch 240', a device 250', or any combination thereof. The at least one additional machine twin 220' shown in the virtualization here is able to receive the same data stream as the second machine twin 220 by virtue of the M2M communication path being a multicast point-to-point communication path 202', sometimes referred to as a point-to-multipoint communication path. The multicast point-to-point communication path 202' allow a single message or a message from a single device to been sent to a group of devices.

FIGS. 2C and 2D illustrate partial virtualizations of unicast and multicast communication path embodiments, respectively, according to aspects of the present disclosure. As can be seen in the virtualization of FIG. 2C, when the M2M communication path is carrying unicast communication (designated 202), each data stream in a plurality of data streams, only two of which are illustrated here at 260 and 262, is routed to a separate point or node, respectively, in the industrial network. A cross-sectional virtualization of the communication path 202 showing the various data streams at or near a terminal of the cabinet twin 230 is shown later herein in FIG. 6. In contrast, as can be seen in the virtualization of FIG. 2D, when the M2M communication path is carrying multicast communication (designated 202'), the same data stream, such as data stream 260, can be routed to multiple points or nodes in the industrial network.

Figure 3:
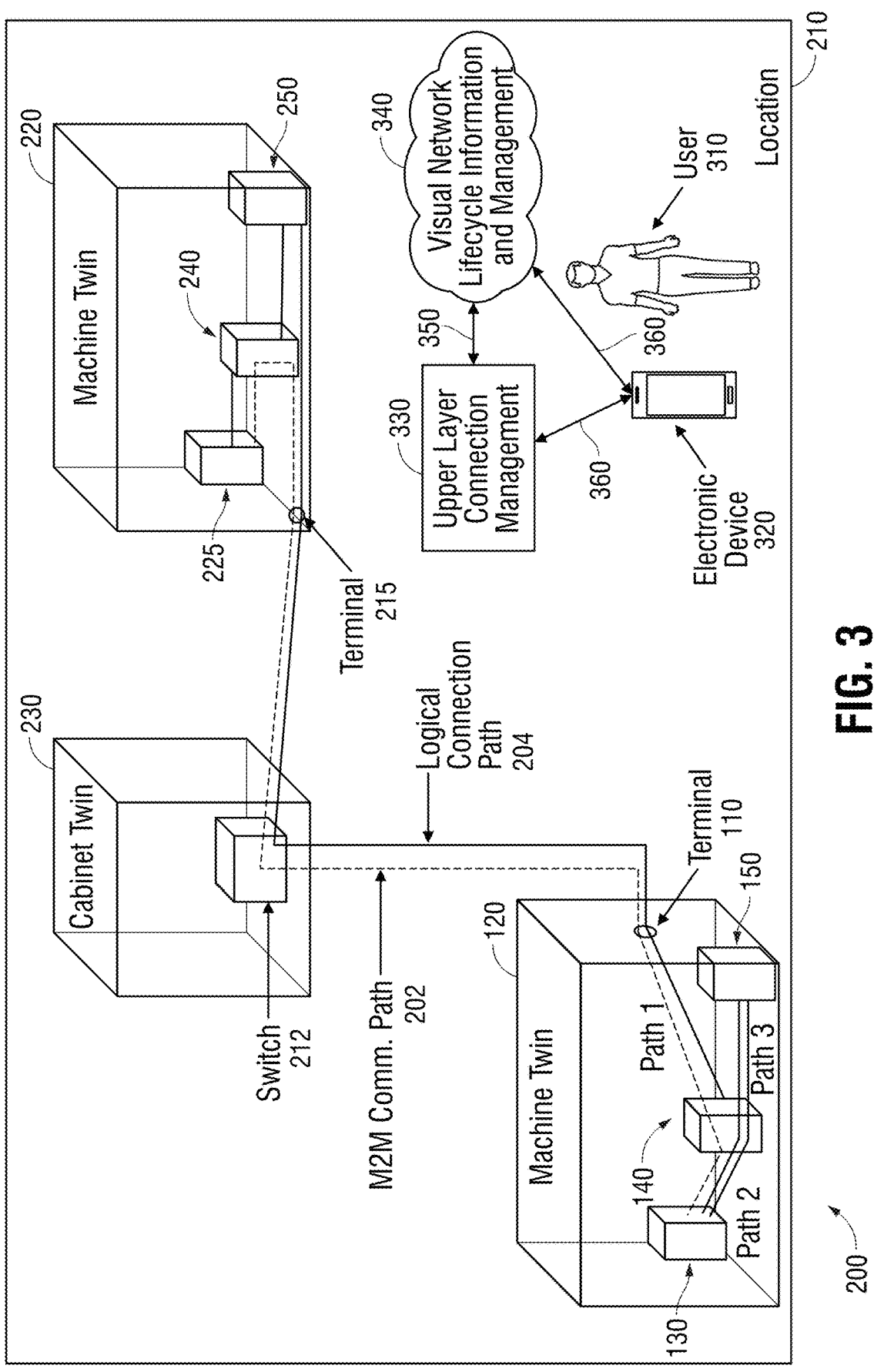
FIG. 3 illustrates a partial block diagram of an embodiment of a plant perspective of any of FIGS. 2A-2B including a user at the location according to aspects of the present disclosure.

FIG. 3 illustrates an exemplary AR visualization in simplified block diagram form partially showing the system 200 (or system 200') from the plant perspective of FIG. 2A (or 2B), this time including a user 310 at the location 210 according to aspects of the present disclosure. As discussed previously, the system 200 includes the machine twin 120, cabinet twin 230, and machine twin 220 and various elements thereof, along with the M2M communication path 202 and the logical connection path 204. FIG. 3 further illustrates a user 310 at the location 210. The user 310 may use or otherwise be associated with an electronic device 320, further illustrated and described herein with reference to FIG. 5A. Also present is an upper layer connection management system 330 (or application) and a visual network lifecycle information and management system 340 (or application) communicatively coupled to each other via an appropriate wired and/or wireless communication link 350. The user 310 may be enabled to create and/or view at least one representation associated with the location 210 by using the electronic device 320 to access, via wireless and/or wired communication links 360, the upper layer connection management system 330 and/or the visual network lifecycle information and management system 340. For example, the user 310 may create a virtualization of a physical space, such as the location 210, either in whole or in part using the electronic device 320. The user 310 may further be able to view real-time or historical data associated with the location 210 using the electronic device 320, as further described herein. In various embodiments, a user 310's view of and/or abilities associated with the system 200 at the location 210 may be tailored or customized based at least in part upon one or more access rights associated with the user and/or to a group to which the user 310 belongs. For example, a user 310 may be limited to viewing an augmented representation of only a portion of the location 210. A user 310 may further be limited to viewing one or more augmented elements and/or real-time information based upon their respective access rights and/or group rights. The electronic device 320 may implement one or more AR elements and may include or be associated with a wearable AR device in various embodiments, for example to provide visualization and/or to enable one or more AR operation(s) described herein (e.g., gesture input, visualization display, etc.). Gestures may include one or more implementations of swipe(s), tap(s), grab(s), push(es), pull(s), drawing(s), tracing(s), and the like useable with 2D and 3D interaction software.

In addition to gestures, the electronic device 320 may also implement voice commands and controls in some embodiments to allow a user 310 to perform many of the same functions and tasks for which gestures are used. As mentioned earlier, implementations consistent with the present disclosure may leverage developments in the AI space, such as GPT, Dali, and DeepMind, among other AI platforms, to provide enhanced gesture functionality that combines traditional gestures with voice and video feedback. For example, a user can point to a device and ask the electronic device 320 to identify and match (via AI) that device with schematics or digital twin available in cyberspace.

FIG. 4 illustrates a flowchart representing a method or process for providing visual lifecycle information and management for an industrial network, which may include Time Sensitive Network (TSN), for a facility or plant according to aspects of the present disclosure. The process 400 includes an operation 402 where a model of a physical system 200 is assembled (e.g., via machine digital twins 120, 220, cabinet digital twin 230, and elements and components thereof) for a location 210 in the facility or plant. This assembling of a physical model may include obtaining at least a portion of the physical model information from a user 310 via an electronic device 340. Additionally or alternatively, at least a portion of the physical model information may be obtained from a building or factory management system, factory or building virtualization system or tool, modeling system or tool, or any other source of information associated with the system 200 at the location 210. A network model of a location 210 is assembled at an operation 404. Network operation monitoring may be enabled at an operation 406 for the location 210. One or more operational characteristics associated with the location 210 or element thereof may be identified, and an indication of the operational characteristic may be selectively provided at an operation 408. An impact parameter associated with the operational characteristic may be determined and an associated impact indication may be selectively provided at an operation 410. One or more operations may be performed based at least in part upon the identified operational characteristic at an operation 412.

Implementations consistent with the method of FIG. 4 may include a method for visualizing an industrial network. In various embodiments, the method may include assembling a model of a plant associated with the industrial network through a virtual factory builder where elements (e.g., all elements or portion thereof) of the plant can be acquired first as digital twin followed by a physical embodiment, model, or actual thing. A model of the industrial network may be assembled based, at least in part, upon recorded input from one or more system users. The recorded input may include gestures and/or physical interactions of the system users indicating various elements, characteristics (e.g., locations, device types, etc.), and/or configurations of the industrial network. Monitoring of operation(s) of the industrial network may be presented via a visual interface (e.g., augmented reality of a monitoring and control system presented on an electronic device 320) by overlaying information from, or derived from, the assembled model of the industrial network onto information from, or derived from, the assembled model of the plant, wherein information flowing from one element of the plant to another in shown in the visual interface. Parameters such as errors or reductions in performance of the industrial network may be identified and/or visually indicated in the visual interface. The parameters (e.g., errors and/or reductions in performance) of the industrial network may be geophysically positioned and/or indicated in the visual interface so that immediate reaction is possible. Methods may include identifying and selectively visually indicating impact of the identified parameters (e.g., errors and/or reductions in performance) of the industrial network on one or more processes associated with the plant in the visual interface. One or more actions may be taken to address the identified errors/reductions in performance of the industrial network. The one or more actions may include providing at least one recommendation for addressing the identified parameters (e.g., errors and/or reductions). The one or more actions may be automatically identified and initiated in various embodiments. The one or more actions may be taken to reduce or eliminate the impact of the identified parameters (e.g., errors and/or reductions in performance) on the one or more processes associated with the plant.

Implementations consistent with the method of FIG. 4 may include a method for visualizing an industrial network. The method may include assembling a plant model of a plant associated with the industrial network, assembling a network model of the industrial network, enabling monitoring of operation of the industrial network, identifying at least one performance parameter of the industrial network, identifying impact of the at least one performance parameter in relation to the industrial network on one or more processes, selectively visually conveying the at least one performance parameter via an overlay of the industrial network at a user interface, and/or taking one or more actions to address the at least one performance parameter. Visually conveying the at least one performance parameter may include providing an augmented reality overlay depicting the at least one performance parameter on or along one or more elements of the plant model. Visually conveying the at least one performance parameter may include providing an augmented internal view of at least one device of the industrial network. Visually conveying the at least one performance parameter may include visually conveying one or more real-time or expected communication flows or statuses.

Implementations consistent with the method of FIG. 4 may include a method for providing services for a network. The method may include creating a location model and a network model associated with the location model, deploying at least a portion of a network according to the location model, selectively modifying the location model as part of the deploying the at least a portion of the network, obtaining information associated with the at least a portion of the network, determining a performance parameter associated with the at least portion of the network, and/or visually conveying the performance parameter in relation to the location model and the network model.

Figure 5A:
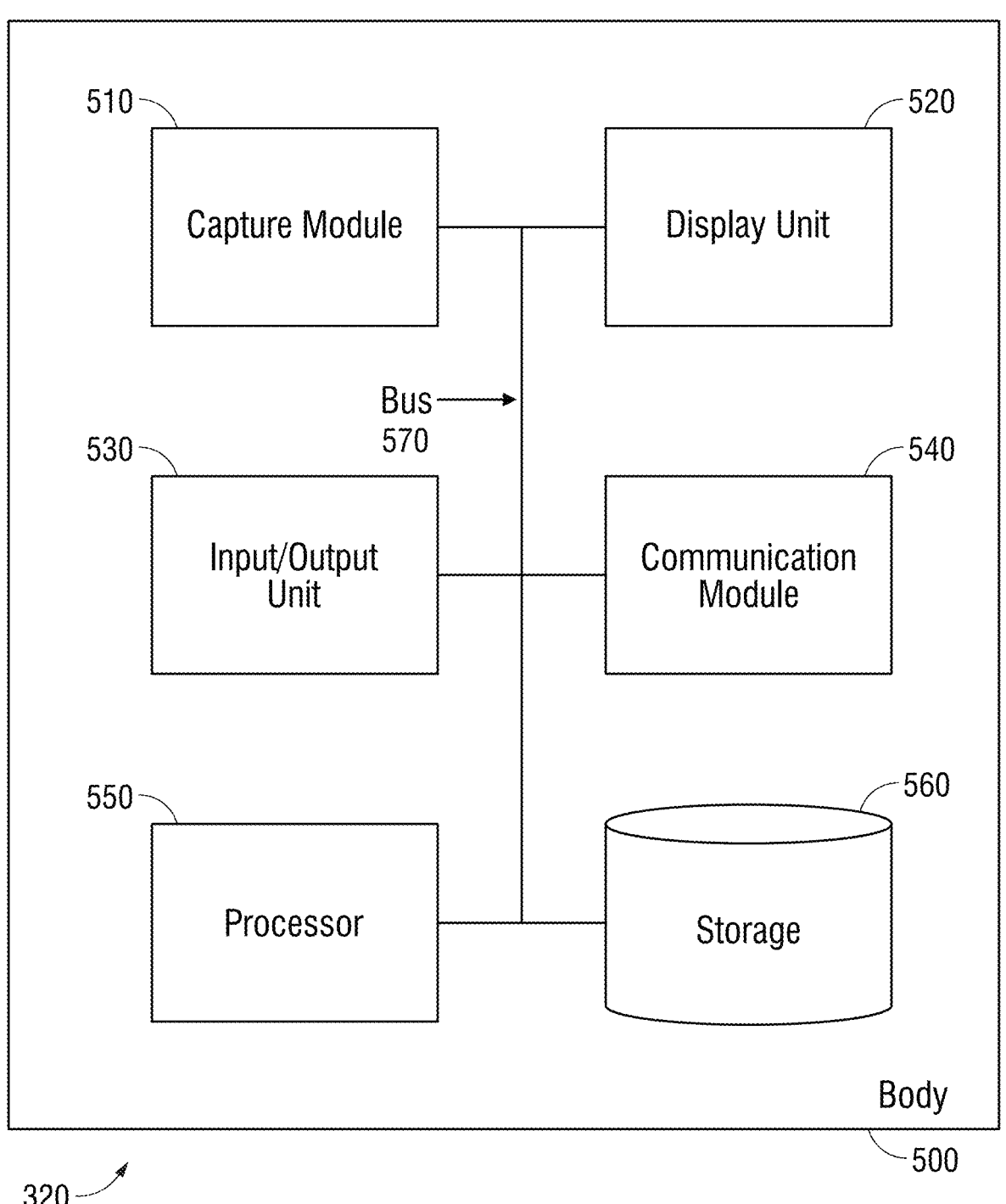
FIG. 5A illustrates a partial block diagram of an electronic device according to aspects of the present disclosure.

FIG. 5A illustrates a partial block diagram of an electronic device 320 according to aspects of the present disclosure. The electronic device 320 may include one or more of a body 500, a capture module 510, a display unit 520, an input/output unit 530, a communication module 540, a processor 550, a storage 560, or combination thereof. One or more of the body 500, capture module 510, display unit 520, input/output unit 530, communication module 540, processor 550, and/or storage 560 may be communicatively coupled to one another, for example via a conductive bus 570. Although illustrated as each being housed within the body 500 of the electronic device 320, it should be appreciated that one or more of the body 500, capture module 510, display unit 520, input/output unit 530, communication module 540, processor 550, and/or storage 560 (or element(s) thereof) may be physically remote from the body 500 of the electronic device 320, either in whole or in part.

The capture module 510 may include a camera or other capture element configured to capture information in relation to a location 210. This may include a camera element which obtains visual information (such as image and/or video data) associated with the location 210 or element thereof. Additionally or alternatively, the capture module 510 may include one or more elements configured to obtain information associated with the location 210 or element(s) thereof, such as ambient information (e.g., temperature, humidity, noise, lighting, and other environmental information), signal data, location or element health information, audio capture information, or any other set of data or metadata associated with the location 210 or element(s) thereof. The display unit 520 may be configured to visually convey information to a user 310 of the electronic device 320. This may include a Liquid Crystal Display (LCD) unit, a Light Emitting Diode (LED) unit, an Organic LED (OLED) unit, retinal projection display, and/or any other display unit or combination of display units capable of conveying information to a user 310 of the electronic device 320. At least one input/output unit 530 may be provided by the electronic device 320. The input/output unit 530 may enable a user 310 of the electronic device 320 to provide input to the electronic device 320. The input/output unit 530 may include a keyboard, a tactile input mechanism, an audio capture unit, or any other element capable of obtaining input from a user. In various embodiments, the input/output unit 530 may be associated with the display unit 520, for example in embodiments whereby the display unit 520 includes touchscreen operation. In various embodiments, the electronic device 320 may include and/or be coupleable to a wearable device, for example to provide display to a user, to enable input from a user, and/or to provide one or more operations described herein. In various embodiments, the electronic device 320 may include or be coupleable to a gesture input device useable by the user 310 to provide input. Additionally or alternatively, the electronic device 320 may include or be coupleable to an augmented reality aid such as vision input/output (e.g., glasses, camera(s), monitors, etc.) and/or input element(s) (e.g., gloves, pointer, body suit, etc.). One or more augmented reality aid may be coupled to and/or communicatively coupleable with the electronic device 320 (for example, via the communication module 540 described herein).

The electronic device 320 may further include a communication module 540. The communication module 540 may provide at least one wired and/or wireless interface for transmitting data or information from the electronic device 320 and/or for receiving data or information at the electronic device 320. The communication module 540 may be configured to communicate via at least one communication medium and/or network, such as one or more wired and/or wireless communication link and/or network(s) capable of exchanging information. In various embodiments, any configuration of one or more machines, devices, and/or elements capable of communicating via one or more communication mediums may be considered a network associated with a location (e.g., location 210). The electronic device 320 may further include a processor 550. The processor 550 may be one or more hardware and/or software processing element(s) configured to perform at least one operation of the electronic device 320, or in furtherance thereof. The processor 550 may take the form a microprocessor in various embodiments. Although not illustrated by FIG. 5, the processor 550 may include one or more volatile or non-volatile memories useable by the processor 550 to execute one or more commands. One or more sets of instructions may be stored at either a local memory or storage of the processor 550 and/or at the storage 560. The storage 560 may include any volatile or non-volatile storage medium configured to store or access one or more sets of data or information usable by or in conjunction with the electronic device 320. The storage 560 may include a random-access memory (RAM), a read-only memory (ROM), an erasable programmable read-only memory (EPROM or Flash memory), and/or any computer-readable medium capable of storing or retrieving information.

Figure 5B:
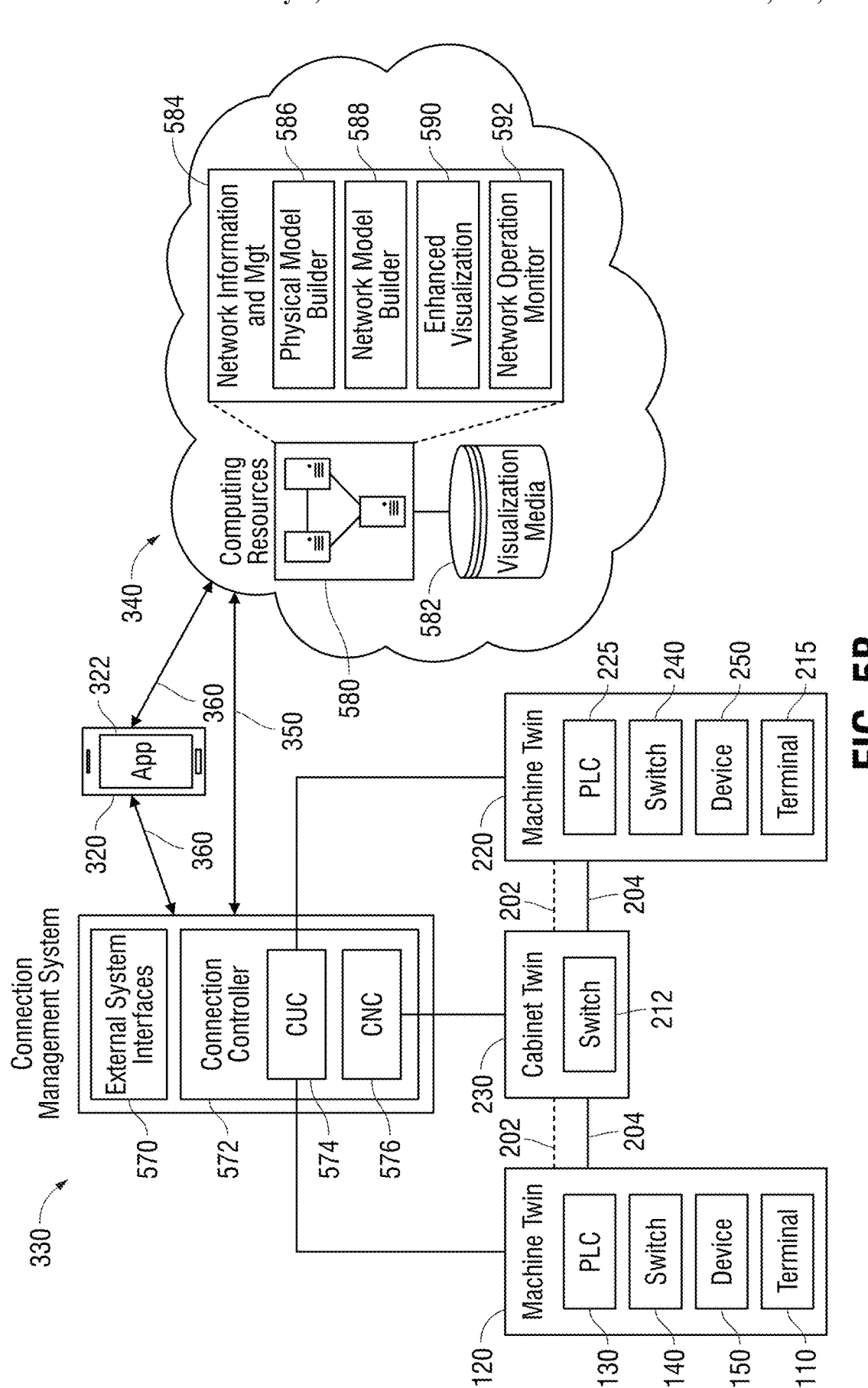
FIG. 5B illustrates a partial block diagram of a system for providing visual lifecycle information and management for an industrial network according to aspects of the present disclosure.

FIG. 5B illustrates a partial block diagram of an exemplary upper layer connection management system 330 and visual network lifecycle information and management system 340 that the electronic device 320 (or user app 322 thereon) may access according to aspects of the present disclosure. In general, the upper layer connection management system 330 operates or may be operated to configure and control the various connections within a network, such as the industrial network at the location 210 (which may be a TSN network), using any of the network communication protocols mentioned earlier (e.g., OPCUA, NETCONF, etc.). The visual network lifecycle information and management system 340 operates or may be operated to create a visualization of a physical space, such as the location 210 and the system 200, either in whole or in part, as well as view real-time or historical data associated with the location 210 and the system 200. The electronic device 320 (or user app 322 thereon) may then access and use these systems via communication links 360 between the electronic device 320 and these systems to perform the various functions described herein.

In some embodiments, the upper layer connection management system 330 includes one or more external system interfaces 574 for interacting with various external systems, and a connection controller 572 for configuring and controlling various connections within a network, such as the industrial network at the location 210. In general, the external system interfaces 574 operates to allow the connection management system 330 to send/receive messages and data to/from and otherwise communicate with external systems, such as the electronic device 320 and the visual network lifecycle information and management system 340, using the appropriate communication protocols. The connection controller 572 operates to allow a user (e.g., network administrator), including user 310, to configure the connection paths between various devices in the network or deploy pre-calculated paths that connect the devices, including via communication paths 202 (or 202') and logical connection paths 204. To this end, the connection controller 572 may include a CUC (Centralized User Configuration) 574 and a CNC (Centralized Network Controller) 576, as well as any other logical entities that may be needed. Note that the CUC 574 and the CNC 576 together operate to provide what is commonly referred to as software defined networking (SDN), leading to intent based networks. The CUC 574 interacts with the devices and/or machines in the network to determine the parameters of the communication paths required by each device and/or machine and passes those requirements to the CNC 576. The CNC 576 receives the parametric requirements from the CUC 574 and accordingly configures the switches in the network to provide the communication/connection paths required by the devices and/or machines. Note in the exemplary embodiment that the upper layer connection management system 330 are shown as controlling and configuring the devices and/or machines in the network via the digital twins thereof (e.g., machine twins 120, 220, cabinet twins 230, and the elements and components thereof). It is of course possible for the upper layer connection management system 330 to directly control and configure the devices and/or machines in the network instead of using their digital twins.

In some embodiments, the visual network lifecycle information and management system 340 is a cloud-based system (or application) that resides on a cloud computing environment, which may be a third-party cloud computing environment accessible via the Internet, or a private enterprise cloud computing environment accessible via a private intranet.

One or more computing resources 580 on the cloud computing environment are used to host and execute the visual network lifecycle information and management system 340. The one or more computing resources 580 may include database resources, processor resources, memory resources, network resources, and the like. These resources may be physical resources and/or virtual resources that are shared among one or more other systems or applications.

In some embodiments, the visual network lifecycle information and management system 340 on the cloud computing environment may include one or more visualization media databases 582 and a network information and management application 584. In general, the visualization media databases 582 store visualization media that can be used to provide enhanced visualization of a network, and the network information and management application 584 uses the stored visualization media to create a virtualization of a physical space, such as the location 210 and the system 200, either in whole or in part, as well as view real-time or historical data associated with the system 200 at the location 210. The type of visualization media stored may include operating manuals, technical specifications, user instructions, and other documentation for the devices and/or machines of the system 200 at the location 210, as well as graphics, icons, images, video clips, audio clips, and other media that may be used to create enhanced visualization of a network like the network of the system 200 at the location 210. These visualization media may be organized by or within the one or more visualization media databases 582 using any suitable content indexing scheme known to those skilled in the art than can allow specific media to be quickly located and retrieved for playback. New and updated visualization media may also be added to the visualization media databases 582 from time to time as needed. For example, once a network device has been identified, in some cases the network information and management application 584 may reach out to a device manufacturer website and obtain virtualization media for the device.

As for the network information and management application 584, in some embodiments, this application 584 includes a number of functional components, including a physical model builder 586, a network model builder 588, an enhanced visualization module 590, and a network operation monitor 592. Those having ordinary skill in the art will appreciate that any of these functional components 586, 588, 590, and 592 may be divided into one or more sub-components and/or combined into one or more super-components within the scope of the disclosed embodiments. In general, these functional components 586, 588, 590, and 592 operate or may be operated to provide the respective functionality described previously with respect to FIG. 4. That is, the physical model builder 586 may be used to build or assemble a model of a physical system 200 (e.g., via machine twins 120, 220, cabinet twin 230, and elements and components thereof) for a location 210 in a facility or plant. The network model builder may be used to build or assemble a network model for the system 200 at the location 210. The enhanced visualization module 590 may be used to create a virtualization of the network for the system 200 at the location 210 using the physical model and the network model. In the network operation monitor 592 may be used to monitor one or more operational characteristics associated with the network of the system 200 at the location 210 or element thereof and perform one or more operations based on an identified impact parameter associated with an identified operational characteristic.

Figure 6:
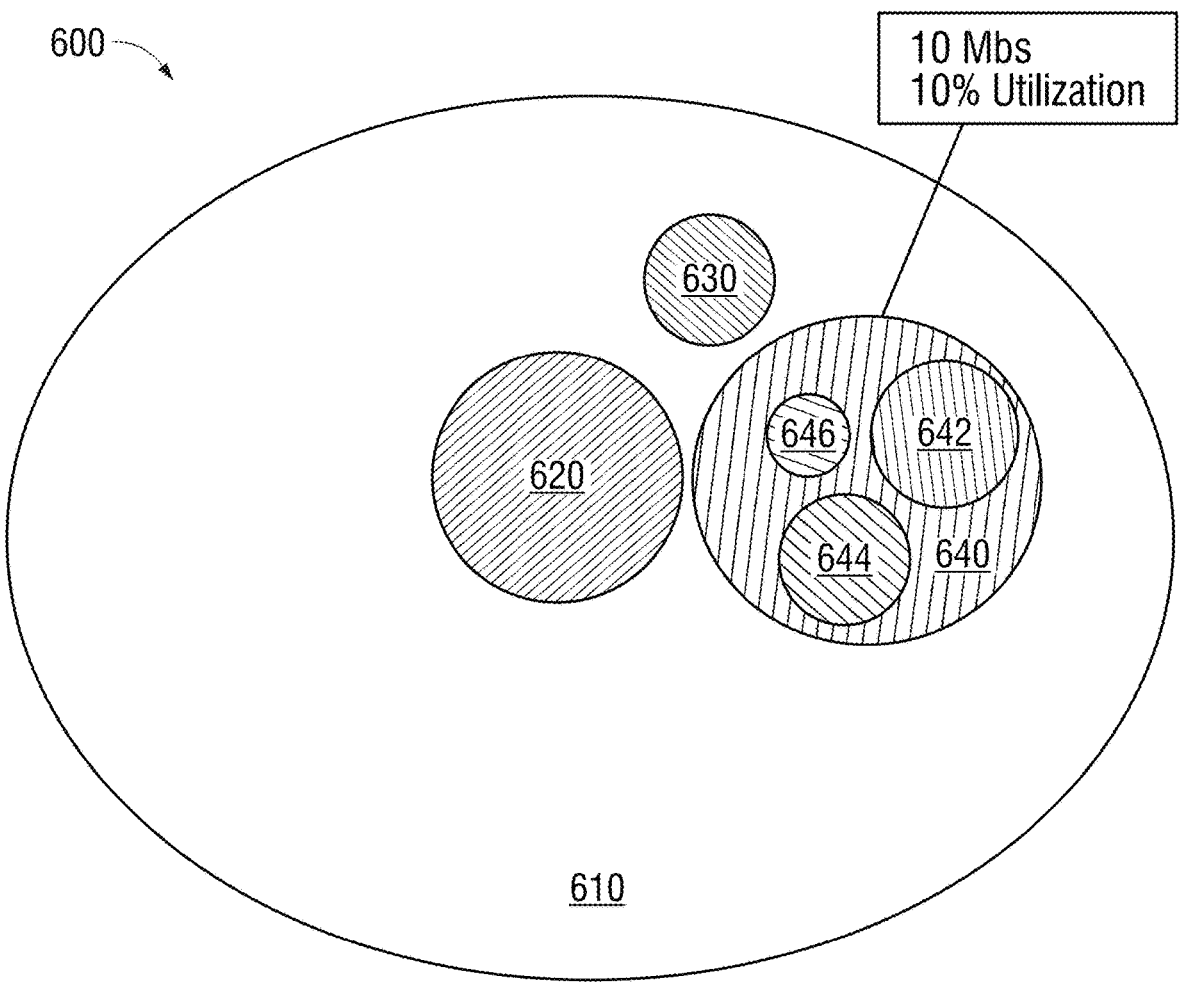
FIG. 6 illustrates a partial diagram of an example of a bandwidth utilization visualization according to aspects of the present disclosure.

FIG. 6 illustrates a partial diagram of an example of a bandwidth utilization visualization according to aspects of the present disclosure. The visualization 600 may be provided as part of an augmented view available to a user 310 of an electronic device 320 in accordance with aspects of the present disclosure. The visualization 600 may be presented to the user 310 of the electronic device 320, for example, during an installation process, during a configuration or provisioning process, in a model or template manipulation process, during real-time maintenance or monitoring, during a simulation operation, or combination(s) thereof. In some embodiments, the visualization 600 may be used to present real-time usage information of a link 610 to a user 310 of an electronic device 320.

The visualization 600 may include a cross-sectional view of a link 610 and respective utilization of available bandwidth of the link 610. In this visualization 600, the link 610 resembles a pipeline with different types of immiscible fluids flowing therethrough, each fluid representing a flow of data in the link 610. For example, the cross-sectional view of the link 610 may represent a 100 Mbps Ethernet link having a 20% utilization across three Virtual Local Area Networks (VLANs). The three VLANs of FIG. 6 are illustrated with reference to VLAN3 620, VLAN2 630, and VLAN1 640. When combined, the VLAN3 620, VLAN2 630, and VLAN1 640 may combine to the 20% utilization of the link 610 at a moment in time. Within VLAN1 640, there are illustrated three streams 642, 644, and 646. The VLAN1 640 may comprise 10% of the total link bandwidth, as illustrated by FIG. 6 (although it should be appreciated that each VLAN may utilize any percentage of the total bandwidth of link 610 without departing from the spirit and scope of the present disclosure). The stream 646 of VLAN3 640 may account for 10% of the total bandwidth of link 610 in the embodiment illustrated by FIG. 6. The bandwidth utilization of streams 642 and 644 may combine to represent the remaining 10% of overall bandwidth of link 610 in the embodiment illustrated by FIG. 6. Hovering over a given stream or tapping on the stream causes data associated with the stream, such as bandwidth, to be visualized, as indicated at 650. Both unicast and multicast streams alike may be virtualized in the manner shown and described in FIG. 6.

Note that the visualization 600 in FIG. 6 is referred to as a cross-sectional view merely as an illustration. As a practical matter, more information is available at or near the end point to which the link 610 is connected rather than near the middle of the link. Moreover, multiple links may be connected to the ports where the VLANS and streams are configured (provisioned), so the term "cable" is simply shorthand for a data medium through which data can flow. The medium may include a physical medium, a virtual medium, or both. The medium may include multiple cables aggregating into a single large overall link, which may also be a wireless link (and hence technically not a cable). Thus, the use of the term "cable" is illustrative only and may be more accurately termed a link or links 610 consisting of a medium and connecting ports. From that perspective, the visualization 600 may contain far more information about the link 610 than merely the bandwidth being consumed. For example, the visualization 600 may also include timing information for any TSN data flow associated with such links 610, presented in a similar manner as bandwidth. In general, the visualization 600 any encompass overlay of any logical information flow over a physical medium segregated by purpose.

The visualization 600 may provide visual indicia to distinguish between communication and/or bandwidth parameters, such as color coding according to data type or classification, stream parameters, or any other physical and/or logical parameter or measurement associated with the cable 610, VLAN, stream, etc. A size, shape, or parameter associated with the visualization 600 may relate to a parameter of the cable 610, such as a total bandwidth. A size, shape, or parameter of a VLAN may relate to a current and/or historical usage of a VLAN, such as a current bandwidth allocated to a VLAN and/or a current bandwidth usage associated with the VLAN (e.g., by a stream thereof). One or more parameters and/or settings associated with a cable 610, VLAN, stream, or other element may be modified, created, and/or removed during operation, for example by a user 310 of an electronic device 320.

Figure 7A:
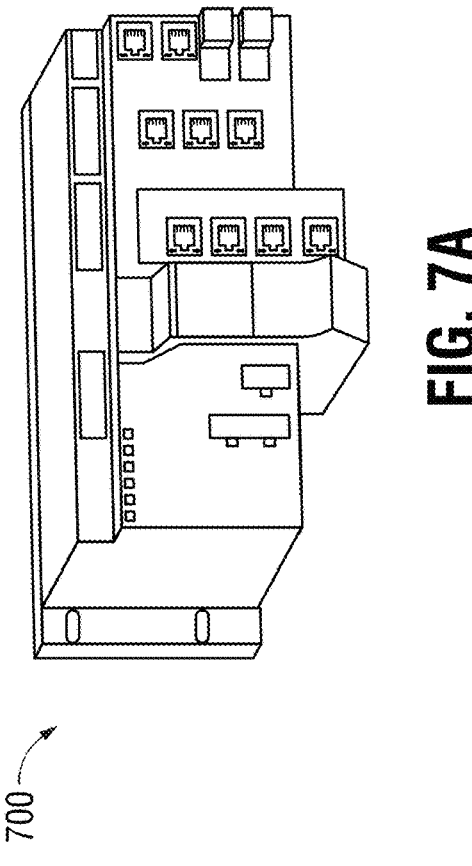
FIG. 7A illustrates a front raised perspective view of an example of an element of a machine according to aspects of the present disclosure.

FIG. 7A illustrates a front raised perspective view of an example of an element of a machine, such as a PLC, according to aspects of the present disclosure. The element 700 of a machine may be part of or an equivalent to a machine 100 as previously described herein. The element 700 may be a controller in various embodiments, for example an Ethernet Programmable Automation Controller (ePAC) such as a Modicon M580 unit by Schneider Electric. As shown in FIG. 7A, from a viewer's perspective, there is no indication of the internal components of the element 700, much less an operational status and/or communication utilization or status associated with one or more elements 700 of a machine from a pure visual inspection. The element 700 may be a device which is installed or installable at a location, for example at a machine or cabinet thereof. The element 700 may be included on a location model and/or a network model of the location, for example in a dual twin scheme. The location model may include a physical location and/or configuration of the element 700 in space and/or physical connectivity to one or more other devices or elements of the location. The element 700 may further be modeled by a network model of the location, for example reflecting one or more logical or communication paths or connections within or otherwise associated with the location, for example between one or more machines or devices within or associated with the location.

In various embodiments, there may be visual indications for externally exposed Ethernet ports of a device via one or more light emitting diodes (LEDs). These LEDs may convey limited information, for example relating to user link state, link speed (limited to high and low), and presence of limited communication (for example, as whether present or not indicated as indicated by rapid flashing of the LED(s)). However, for internal connectivity, these LEDs are not present. Once the device is enclosed into a machine or cabinet, these LED indicators may not be exposed. Digital twins as implemented according to the instant disclosure may be nested in a same manner as a part of the machine is nested in the machine. That is to say that a user may be capable of peeking into a machine or cabinet and deeper into the parts and/or connections of the machine until an "atomic" level is reached. In various embodiments, one or more PLC cabinet(s) and/or telecommunication cabinets, racks, or enclosed server rooms may be implemented as a cabinet as described herein. A cabinet may be any type of enclosure, regardless of size. Therefore, looking down into the details of a machine may be referred to as zooming to an "atomic level," which at a macro scale may be similar to zooming out to "universe." Groups of machines and their assemblies can be referred as a factory section or plant, and its communication can be aggregated and displayed as such based on the available data and modeling.

In a visual context, some of the connections can be aggregated into larger connections. For example, if the machine has multiple network interfaces then each individual interface and its connectivity can be visualized in the manner previously described. However, if a user zooms out to a macro connectivity level, then multiple machines can connect to a cloud and this can then reflect one aggregated link to a cloud representation. This aspect may reduce the number of visualized objects and network connections presented to users in various embodiments.

Figure 7B:
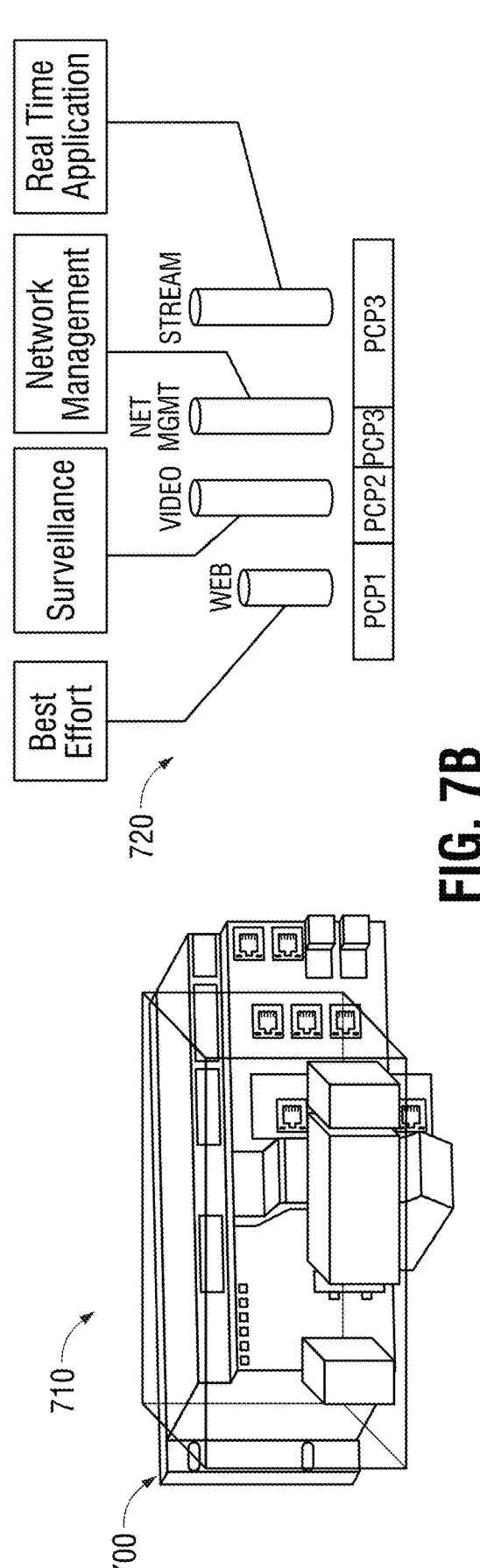
FIG. 7B illustrates an example of an augmented machine model of an element of a machine of FIG. 7A according to aspects of the present disclosure.

FIG. 7B illustrates an example of an augmented device model of an element of a machine of FIG. 7A according to aspects of the present disclosure. The augmented element 710 may include an augmented rendering either overlaying at least a portion of an element 700 or visually separate from the element 700. The augmented rendering may reflect one or more physical and/or logical elements of the element 700, optionally along with one or more communication paths, connections. or configurations. A user 310 (FIG. 3) may view the augmented element 710, for example using an electronic device 320. The user 310 may view the augmented representation as a three-dimensional (3D) view of a basic machine outline having one or more elements therein or thereupon. The system may be configured such that at least a portion of operations and/or information viewable by the user 310 of the electronic device 320 may be defined based at least in part upon one or more roles assigned to the user 310, group to which the user 310 belongs, a parameter associated with the electronic device 320, or any combination thereof. For example, an installer user 310 of the electronic device 320 may only be permitted to view information and/or AR data limited only to a defined installation area, a known device to be installed or configured, a time period during which the installer is provided access to an area, or any other limitation, for example geophysical, temporal, and/or role-based.

The augmented device model of FIG. 7B may further includes a configuration map 720 that may be presented alongside the augmented element 710. The configuration map 720 illustrates an example of network traffic type identification usable with systems consistent with the present disclosure. For example, the configuration map 720 may be able to tag and/or isolate network traffic or simulation thereof according to aspects such as, but not limited to, web traffic, which may be assigned best effort status, video traffic which may be associated with surveillance, network management, and/or real-time application which may include one or more prioritized streams. The one or more identifications and/or statuses may be provided distinct colors or other identifying characteristic(s) for use with augmented views of a location 210 and/or element(s) thereof. The configuration map 720 may relate to one or more sets of information viewable to a user 310 of an electronic device 320, for example in relation to network traffic associated with the element 700 and/or other device(s) or machine(s), for example over a wired and/or wireless communications medium. This information may be visually displayable to the user 310 of the electronic device 320, for example using AR augmentation of a display of the electronic device 320.

Figures 8A, 8B:
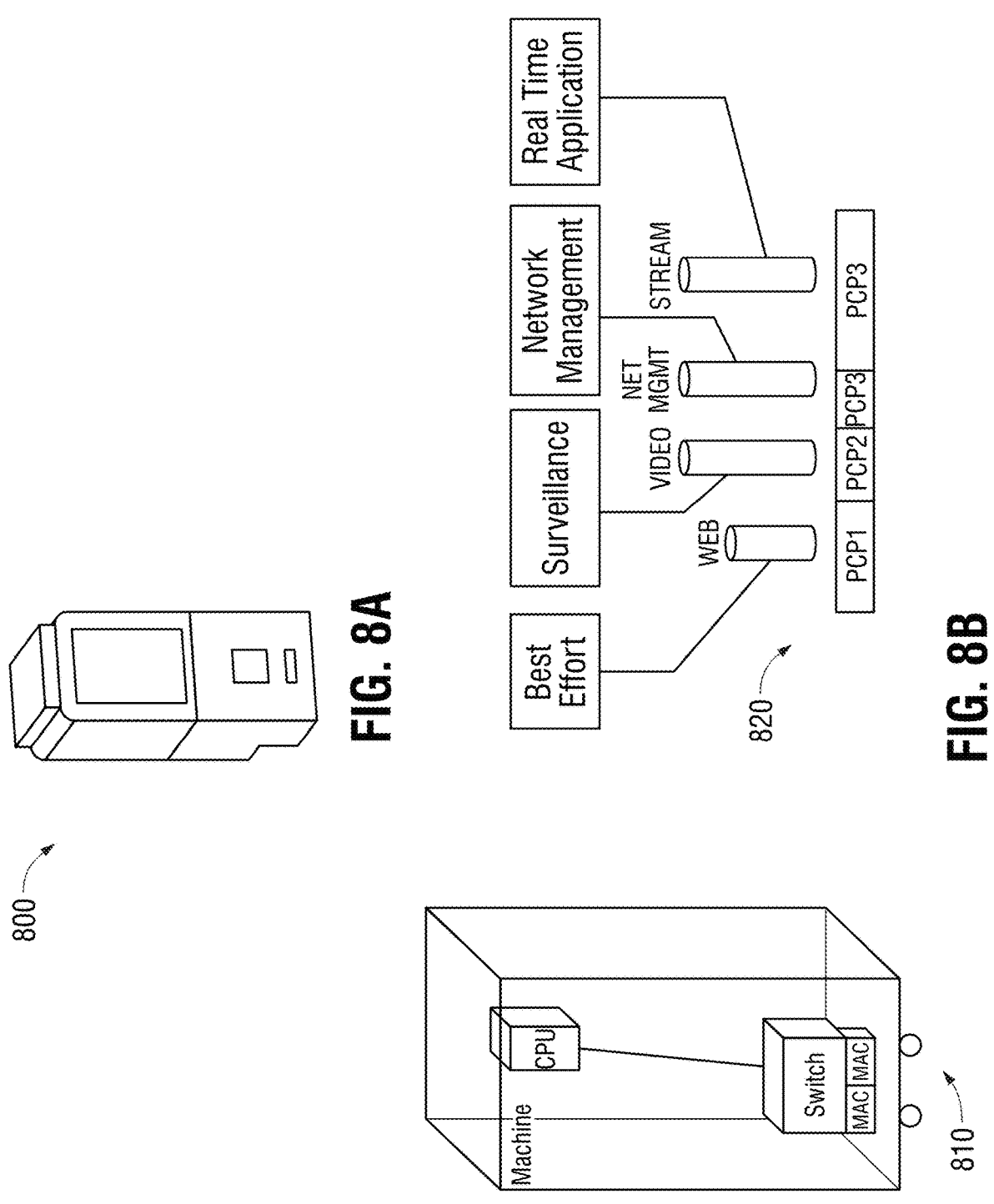
FIG. 8A illustrates a front left raised perspective view of an embodiment of an element of a machine according to aspects of the present disclosure.
FIG. 8B illustrates an example of an augmented device model of an element of a machine of FIG. 8A according to aspects of the present disclosure.

FIG. 8A illustrates a front left raised perspective view of an embodiment of an element of a machine according to aspects of the present disclosure. The element 800 of a machine may be housed within a cabinet such as an equipment cabinet. The element 800 may be an ALTIVAR® series device available from Schneider Electric USA, Inc. in various embodiments. The element 800 may be part of a machine and/or may be designed to be used in conjunction with an equipment cabinet. Additionally or alternatively, the element 800 may be a machine 100 or portion thereof of a type previously described herein, or component thereof. As shown in FIG. 8A, from a viewer's perspective, there is no indication of the internal components of the element 800, much less an operational status and/or communication utilization or status associated with one or more elements of the element 800 from a pure visual inspection. The element 800 may be a device which is installed or installable at a location, for example at a machine thereof. The element 800 may be included on a location model and/or a network model of the location, for example in a dual twin scheme. The location model may include a physical location and/or configuration of the element 800 in space and/or physical connectivity to one or more other devices or elements of the location. The element 800 may further be modeled by a network model of the location, for example reflecting one or more logical or communication paths or connections within or otherwise associated with the location, for example between one or more machines or devices within or associated with the location.

FIG. 8B illustrates an example of an augmented device model of an element of a machine of FIG. 8A according to aspects of the present disclosure. The augmented element 810 may include an augmented rendering either overlaying at least a portion of element 800 or visually separate from the element 800. The augmented rendering may reflect one or more physical and/or logical elements of the element 800, optionally along with one or more communication paths, connections. or configurations. A user 310 may view the augmented element 810, for example using an electronic device 320. The user 310 may view the augmented representation as a 3D view of a basic machine or device outline having one or more elements therein or thereupon. The system may be configured such that at least a portion of operations and/or information viewable by the user 310 of the electronic device 320 may be defined based at least in part upon one or more roles assigned to the user 310, group to which the user 310 belongs, a parameter associated with the electronic device 320, or any combination thereof. For example, an installer user 310 of the electronic device 320 may only be permitted to view information and/or AR data limited only to a defined installation area, a known device to be installed or configured, a time period during which the installer is provided access to an area, or any other limitation, for example geophysical, temporal, and/or role-based.

Similar to FIG. 7B, FIG. 8B further includes a configuration map 820. The configuration map 820 illustrates an example of network traffic type identification usable with systems consistent with the present disclosure. For example, the configuration map 820 may be able to tag and/or isolate network traffic or simulation thereof according to aspects such as, but not limited to, web traffic, which may be assigned best effort status, video traffic which may be associated with surveillance, network management, and/or real-time application which may include one or more streams. The one or more identifications and/or statuses may be provided distinct colors or other identifying characteristic(s) for use with augmented views of a location 210 and/or element(s) thereof. The configuration map 820 may relate to one or more sets of information viewable to a user 310 of an electronic device 320, for example in relation to network traffic associated with the element 800 and/or other device(s) or machine(s), for example over a wired and/or wireless communications medium. This information may be visually displayable to the user 310 of the electronic device 320, for example using AR augmentation of a display of the electronic device 320.

Figure 9:
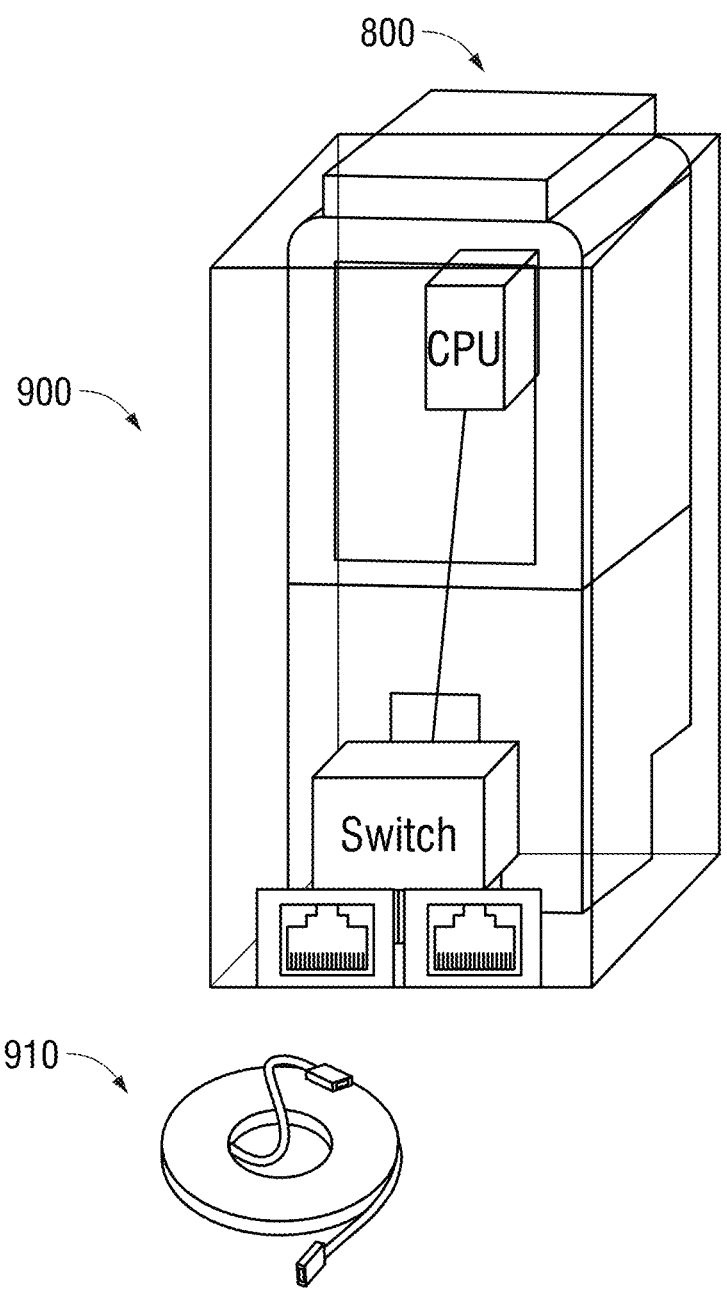
FIG. 9 illustrates a raised front perspective of an embodiment of a device according to aspects of the present disclosure.

FIG. 9 illustrates a raised front perspective of an embodiment of a machine according to aspects of the present disclosure. The machine 900 may include one or more ports capable of connecting to a cable 910. Implementations consistent with the present disclosure may be configured such that an augmented view presented to a user 310 of an electronic device 320 may be presented during installation, operation, and/or maintenance of the machine 900 with a visual indicia, such as highlighting or cue (although not limited to solely visual criteria but could be extended, for example, to one or more audio or tactile feedback). This may include real-time verification of installation by matching with a network global view in an IA metaverse, for example using installation information associated. In some embodiments, while connecting cables a proper port may be highlighted and a description of the cable may be provided and/or matched to cable packaging (e.g., using cable matching by Optical Character Recognition (OCR) or other cable information—for example to ensure a proper cable type, length, etc.). Furthermore, if devices are active, immediate feedback on one or more neighboring devices may be provided and verified according to aspects of the present disclosure (e.g., using neighbor matching using Link Layer Discovery Protocol (LLDP) information or other available or obtainable information).

Figure 10:
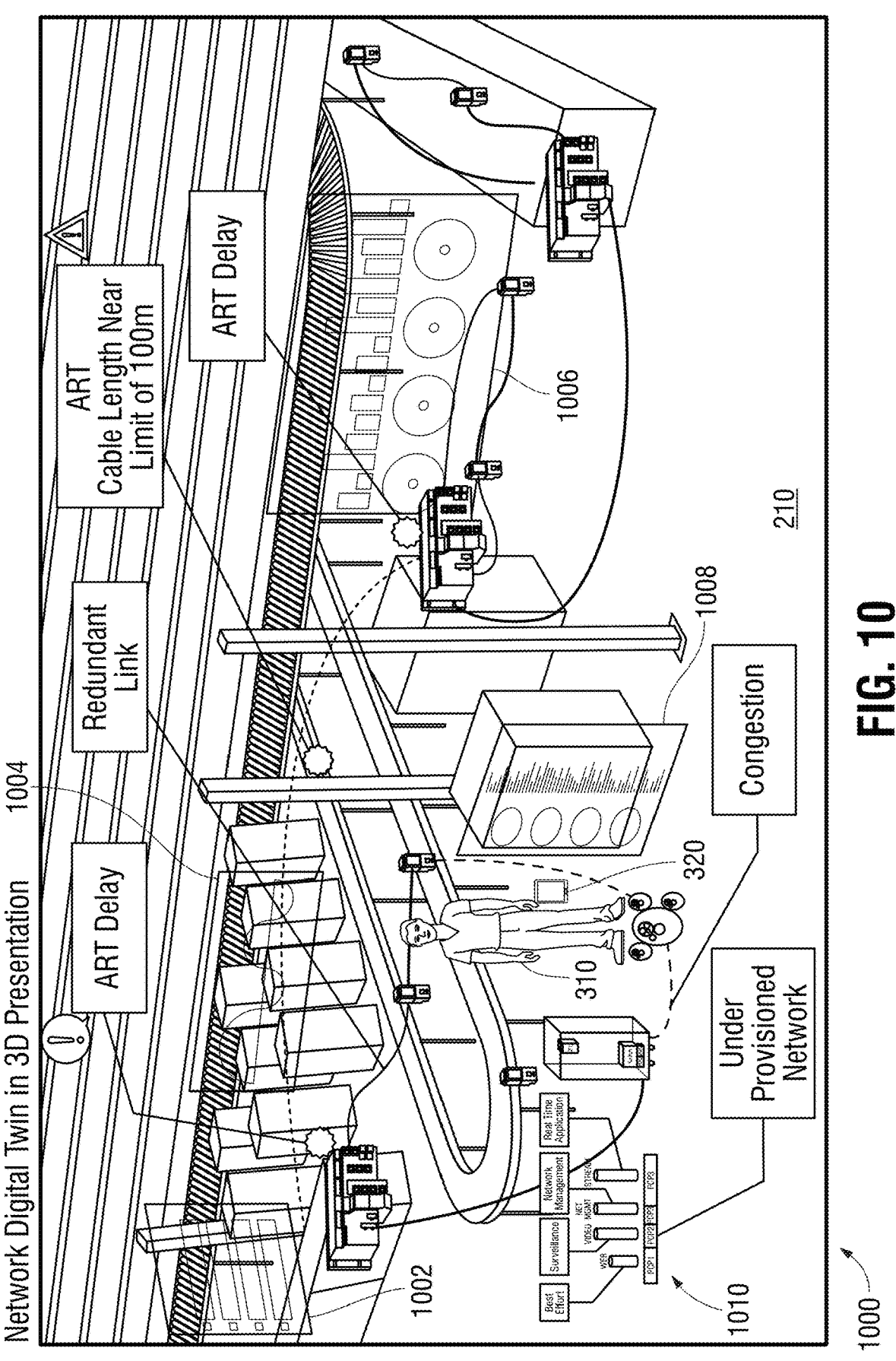
FIG. 10 illustrates a partial view of an example of a simplified three-dimensional network overlay according to aspects of the present disclosure.

FIG. 10 illustrates a partial view of an example of a simplified three-dimensional network overlay according to aspects of the present disclosure. The system 1000 includes a plurality of machines and/or elements (e.g., machines 100 and/or element(s) 700, 800) at a location 210. A user 310 using an electronic device 320 may be at the location 210 and may use an augmented view on a display of the electronic device 320 to view one or more device and/or communication parameters or configurations. For example, in the system 1000 the user 310 may be provided with an augmented display of the location 210 including augmented overlays for various networked devices and current network information, generally indicated at 1002, 1004, 1006, 1008, 1010, respectively. This may include a plurality of visual elements depicting a status or parameter associated with a machine, a device, a communication path, cable, etc. This may include a color-coded scheme capable of visually depicting an operational status of at least one machine, device, communication path, cable, etc. For example, in the system 1000 the user 310 using the electronic device 320 may identify one or more errors or network issues at the location 210. This may include, for example, identifying congestion between two or more machines (e.g., optionally including a cross-sectional cable or link view as illustrated and described above with reference to FIG. 6). The user 310 may be presented with information indicating congestion between two or more machines, for example as caused by an under provisioned network. One or more courses of action may be identified and optionally presented to the user 310 or otherwise implemented by the user 310 to mitigate or remedy any identified issue(s). The visualization may identify one or more redundant links and may combine both physical requirements/potential issues alongside network traffic information. This may include identifying issues relating to a cable length being close to or exceeding a distance limit. One or more round trip delay issues may be visually indicated to the user 310 of the electronic device 320, permitting the user 310 to quickly identify a source of network issues and remedy the issues, for example using one or more gestures in various embodiments.

One or more of the machines or devices of the digital twin of system 1000 can be distributed, centralized, and/or hybrid. Centralized Network Controllers (CNCs) may be used to supply intelligence in network segmentation and calculus, for example as a source of information. In this model, an entity such as an EcoStruxtureNetwork may serve as an industrial Centralized User Configurator (CUC) and/or Central Network Controller (CNC) which can translate application needs by integrating with one or more engineering tools, such as an EcoStruxtureAutomationExpert (EAE) by Schneider Electric, Supervisory Control and Data Acquisition (SCADA) systems, Human-Machine Interface(s) (HMI(s)), and/or interpreting application needs. Embodiments herein have the ability to combine one or more of these entities with the needs of IA management systems such as Manufacturing Execution System (MES), Automated Manufacturing Systems (AMS), Warehouse Management System (WMS), Enterprise Resource Planning (ERP), and may provide global network connectivity view.

An entity such as an EcoStruxtureNetwork in this stage is capable of providing insights on CNC calculated configurations, direct access to virtual terminals of the devices either from distance (e.g., remotely) or in direct connection with the device. A virtual terminal may be envisioned as an augmented web or CLI-like interface with an overlay on the physical device where each functionality can be readied and connected to a relevant configuration in the network digital twin model. One example is visualization of configured Time Sensitive Networking (TSN) time aware shaper gates as they are configured e.g. CNC has the ability to provision a network or portion thereof based on internal network calculus. While the CNC can be integrated into an entity such as an EcoStruxtureNetwork in some deployments, the entity such as an EcoStruxtureNetwork may be configured to serve as CUC for industrial application and management system(s) for federated CNC. With information from EAE and other IA software, entities such as EcoStruxtureNetwork are capable of providing a plurality of operations, including one or more of:

Visual representation of network functions and their overlay on the physical topology.

Matching of topological configuration including original and redundancy paths through the network.

Augmented virtual terminals with interactive configurations via gestures

Visual representation of configurations related to neighboring devices selectable by:

Network segmentation (maintenance, network management, operations, critical safety etc.;

Traffic labeling or application stream tagging;

Physical connectivity;

Representation of expected streams vs actual active connections;

Graphical representation of filtering, policing, and shaping process of network devices as a chain of virtual functions; and Cybersecurity access control and current connectivity (e.g., including unidentified and/or potentially cyber unsafe devices or the like).

Representation of the network as an Open Systems Interconnection (OSI) network model Network segmentation on VLAN Segmentation on IP Segmentation per application protocol TSN time domains TSN frame timing expectations Confirmation of configuration changes committed by automated systems such as CNC as reaction to network connectivity changes.

Selection of redundancy protocols and desired path. This may include Rapid Spanning-Tree (RSTP) as a redundancy strategy, whereby a redundant path is not used if the primary path is available. If the primary path is lost, the redundant path may be activated after a delay. This delay is network convergence time. Visualization can depict such state as a dotted or faded connection. Additionally or alternatively, one or more replication protocols may be used to achieve seamless redundancy. Replication may refer to a replica of network traffic which is passing through the network, wherein frames are duplicated along the path and eliminated at the destination (802.1cb Frame Replication and Elimination (FRER)). since there are replicas of the frame traveling in parallel there is no primary path frame from either path is used and its copy is eliminated. Therefore, if we lose one path, the other path is already active and there is no disruption to communication. One or more visualizations can depict this scenario with a slightly different effect (e.g., blinking or a slight shading of the active link coloring). Redundancy of these types may provide diagnostic value to an end user of the system; and Evaluation of latency and bandwidth utilization characteristics of the paths.

Evaluation of bandwidth utilization of the paths.

Once the network is operational it can be monitored, diagnosed, repaired, and/or expanded as a holistic system with a direct view of impact to the IA application and rest of the network. For example, simply by walking through the plant floor, an engineer or any personnel (e.g., user 310) can visualize network operations via the electronic device 320 based at least in part upon their preference and its impact on current production. For example, by using a gesture of elongating Time Aware Shaper (TAS) time on a virtual configuration interface with proper authorization, an under provisioned network can be adjusted and faults can be cleared from the floor (as illustrated and described herein with reference to FIG. 11). Similar experiences are possible even when physical connections are lost.

Figure 11:
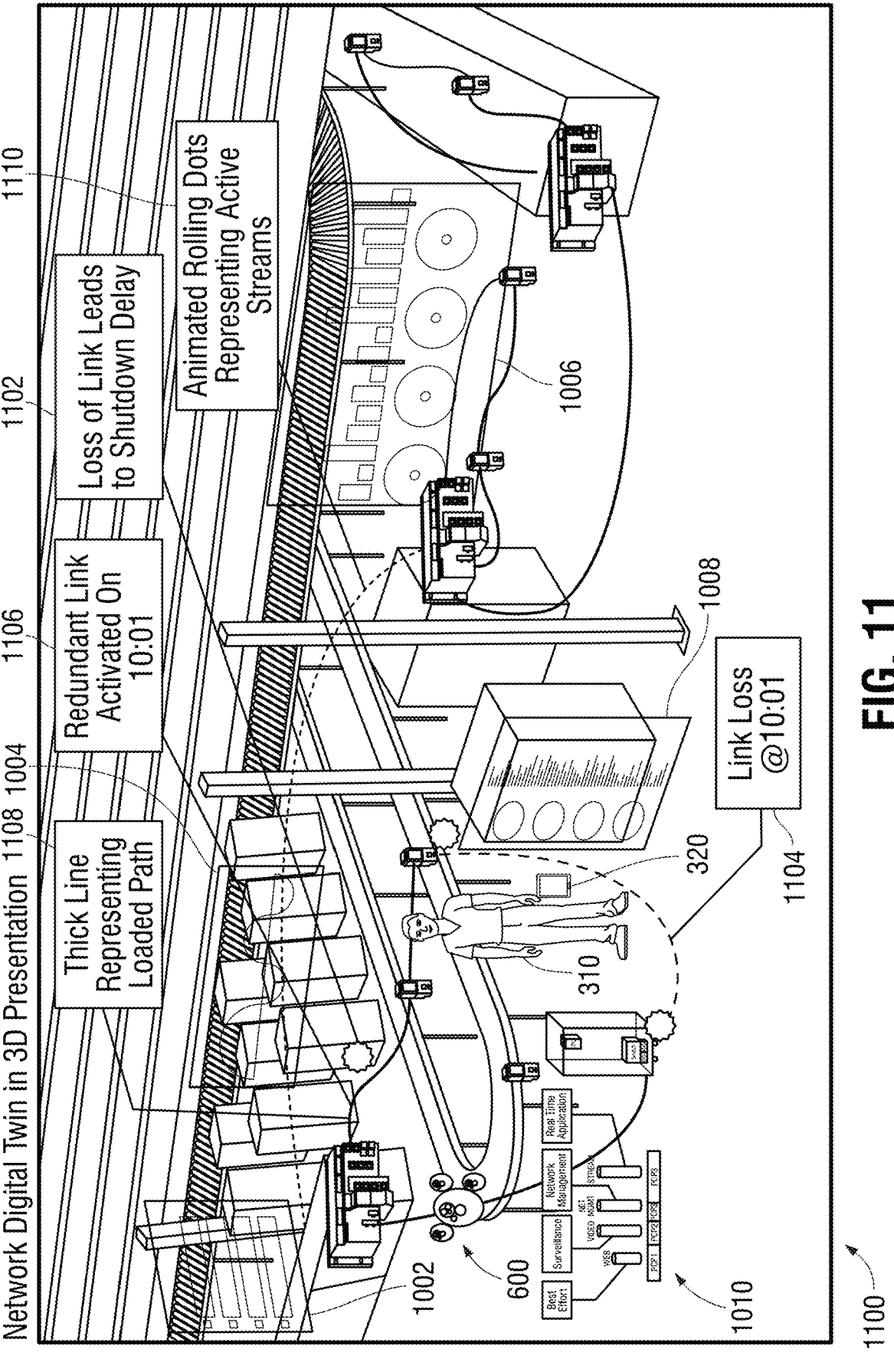
FIG. 11 illustrates a partial view of an example of a simplified three-dimensional network overlay reflecting real-time manipulation according to aspects of the present disclosure.

FIG. 11 illustrates a partial view of an example of a simplified three-dimensional network overlay reflecting virtualization of real-time manipulation of a system 1100 according to aspects of the present disclosure. The system 1100 includes an example of a reconfiguration of the system 1000 based upon one or more identified network issues at the location 210. Using the electronic device 320, the user 310 may be permitted to manipulate one or more machines, devices, communication paths, and/or cables, for example using one or more gestures. For example, based at least in part upon a link loss between machines at 1102, a redundant link may be activated at 1104, for example, by the user 310 via the electronic device 320, or more commonly, automatically by the system 1100 (with user action needed mainly to restore lost network links, for which he/she can use the network visualization herein with geo positioning to the efficiently locate the disruption point and perform diagnostics and repair). The augmented view of the location 210 may then reflect updated communication paths and statuses reflecting the redundant link activation at 1106. This may include depicting identifiers such as line thickness to reflect a loaded vs. unloaded path at 1108. One or more visual indicia of active streams may be provided, for example using animated rolling dots or other visualization to represent active screens at 1110.

At this level, even collaboration between users and the system may be enhanced via content sharing and/or information mapping. For example, a floor engineer can share his or her view with an offsite or remote engineer, equipment manufacturer, or any other entity for example to provide improved capability for diagnostics, deployment, or repair. This may be similar to remote viewing capabilities, however in augmented reality, an entire experience may be elevated and supplemented with intelligent information and selectively conveyed or conveyable. In various embodiments, a view of an on the floor engineer can be shared with a control room or even a view of a site chief engineer can be shared for better coordination of actions. For example, a machine manufacturer may instruct an on-site engineer to look under a machine in front of the engineer to see a reset button, which may be optionally augmentable to provide indicia such as coloration, highlighting, or other means of identifying a particular element or device. In the example, the on-site engineer may perform the task using the augmented view and completion of the task may be identified both locally by the engineer and selectively remotely by one or more offsite users. Visualization of information mapping may include information at a holistic view, including a physical layer, a logical layer, a traffic layer, and/or a function layer. This may include functional and role views, from the physical, logical, traffic, function, and business layers. At the physical layer, implementations may include engineering, maintenance, and security operations, including managing physical network connectivity and policies. At the logical layer, implementations may include engineering and security operations, including managing logical network segmentation, connectivity, and/or policies. At the traffic layer, implementations may include engineering and security operations, including managing communication policies, monitoring usage, and identifying communication health. At the function layer, implementations may include operations including managing industrial functions. At the business layer implementations may include management operations including monitoring impact of network elements on one or more businesses. Information may be shared based at least in part upon network access level and pertinence of the information. While protocols might be updated, the principles remain the same, thus implementations consistent with the present disclosure may be protocol agnostic, and thus are not limited to only identified or described protocols.

Implementations consistent with the present disclosure may include an OPCUAFX information model specifying assets and their functions complemented with network interfaces. This model can be used to present all devices in a 3D perspective, for example using the electronic device 320. NETCONF/YANG networking models may be used to enable vast amount of data for construction of links and information flows. One or more network diagnostic and monitoring protocols may be used to extend the network into the TSN domain. Microsoft, Amazon, Google, and/or open stack clouds may be leveraged for hosting complex services and providing data access. Communication protocols for efficient and unified data exchange such as OPCUA, REST, MQTT, etc. may be used. Augmentation devices such as Microsoft HoloLens, Google glasses, etc., may be used as part of electronic device 320 or in association with an electronic device 320. Additionally or alternatively, in various embodiments an augmentation device such as Microsoft HoloLens, Google Glasses, Oculus Rift, etc., may perform one or more operations described herein with reference to the electronic device 320, and may further include or be communicatively coupleable with one or more input/output device associated with a user, for example to obtain gesture input from a user and/or to provide information or feedback to a user. In some embodiments, the electronic device 320 is an augmentation device, such as Microsoft HoloLens, Google Glasses, Oculus Rift, or any other electronic device capable of providing and/or use with an AR, Virtual Reality (VR), and/or metaverse environment or element.

With these technologies and information that they provide, entities such as an EcoStruxtureNetwork can represent various visual representations that may be useful to a user in diagnosing and/or repairing one or more network faults or simply adjusting the network for optimized performance: This may include providing animated sets of 3D objects representing data flows, pop-up callouts (e.g., with sound effects) pointing toward intelligible statistics and hinting to problem causes and proposed remedies, integrated frame sniffers for direct traffic analysis, real-time statistics on devices and data flows using histograms or other graphing methods, device digital twin overlays with diagnostic information, hovering error, warning, information, and/or question callout points at a location of an error with geolocation (e.g., an icon above the location of a fault visible from anywhere on the plant floor, such as a pictogram, and which may be customizable to fit a user 310's visualization preferences), and/or a cable or link cross-cut equivalent to original creation section augmented with real-time feedback and/or information. Error indications, warning indications, security warnings, and information identifiers are some of the categories that can be covered using one or more pictograms, for example. One or more pictograms or icons may be specific to one or more products and/or installations, and may be associated with one or more styles and/or identifier(s).

Visualization of time synchronization may be accomplished through an immediate diagnostic with visual labeling of quality (e.g., a green vs a red clock) as part of visualization of the digital twin. Visualization of one or more connections of non-accounted or uncertified devices may be performed. Devices that are present and connected to the network without a match to the network plan. (e.g., laptops, test equipment, etc.) may be labeled with one or more security warnings. Various animated sets of 3D object may include, for example, one or more of:

different colors, tagging, numbering and other means of marking priorities or priority levels of the streams;

different colors, tagging, and numbering representing any gas point-to-point versus multicast point-to-multipoint types of traffic;

shading of colors, tagging, and numbering representing redundant paths;

animation levels marking speed of data exchange;

width of lines representing amount or volume of data (e.g., traffic load);

graphs for histography of flows;

transparent lines representing inactive yet configured flows;

dashed lines representing link losses; and/or dotted lines, colors, and/or tags representing wired or wireless connections (e.g., WiFi, 5G, etc.).

The above examples are only a subset of representations that are customizable to fit user visualization preferences. All of these technologies may provide connectivity and data. However, all of these technologies are enhanced by intelligent binding of the data using standardized protocols and providing a useful representation to the user. Implementations consistent with the present disclosure may provide the right data in the right format to the right user at the right time and right place (e.g., location). Even network lifecycle phases may become blurred, and each network feature can be used in any of the phases based on the needs of the network users and their confidence to alter the network.

Figure 12:
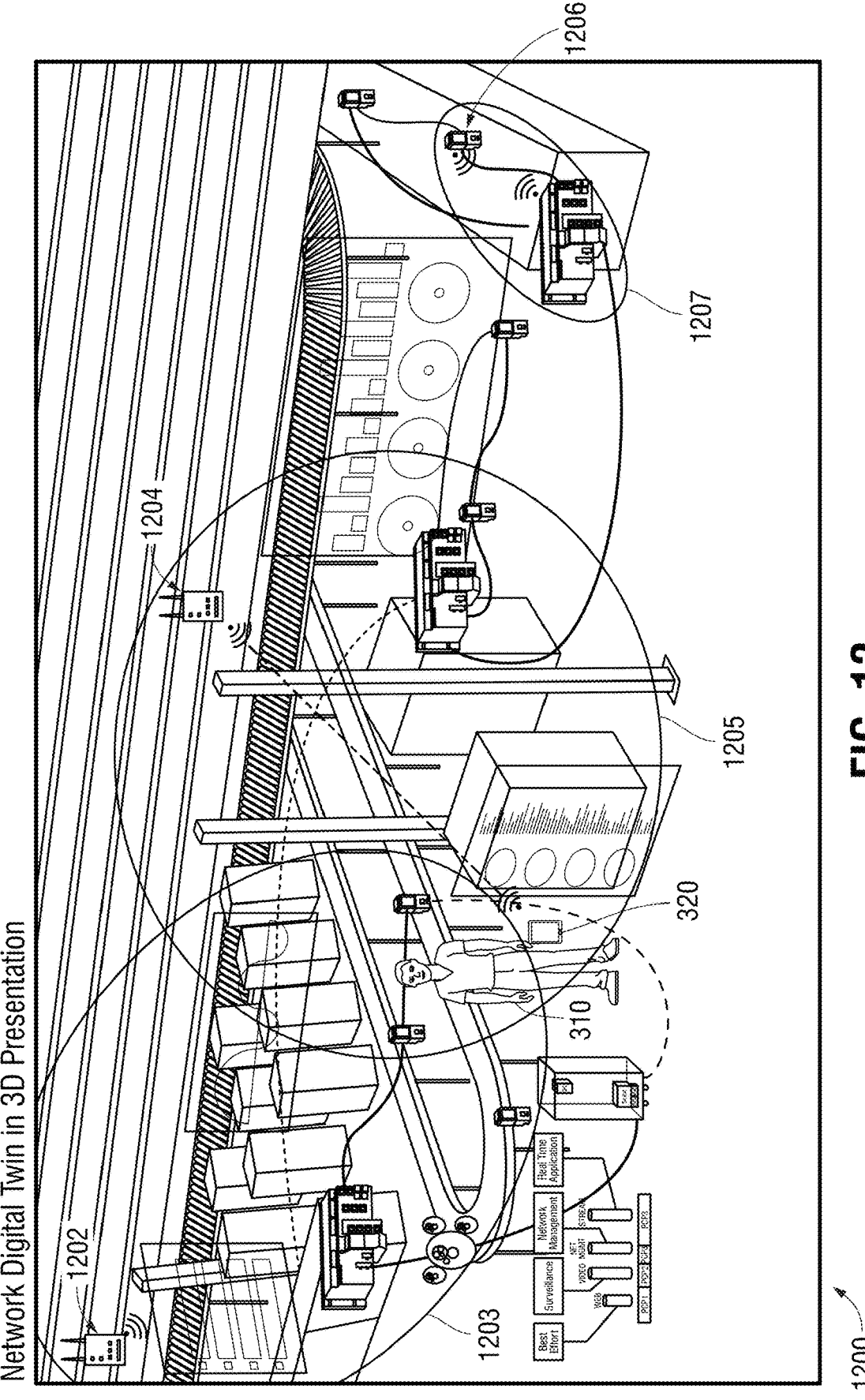
FIG. 12 illustrates another partial view of the example of the simplified three-dimensional network overlay reflecting real-time manipulation from FIG. 12 according to aspects of the present disclosure.

FIG. 12 illustrates another partial view of the example of the simplified three-dimensional network overlay reflecting a virtualization of real-time manipulation of the system 1200 according to aspects of the present disclosure. The system 1200 is otherwise similar to the system 1100 from FIG. 11 except that additional network components are shown at the location 210 in this view. In this example, which may be combined with the exemplary virtualization from FIG. 11, the virtualization of system 1200 further includes depiction of several routers 1202, 1204, and 1206, at the location 210. Using the electronic device 320, the user 310 may view each router 1202, 1204, or 1206 and the reachability (i.e., reachable area) and directionality for each router, indicated at 1203, 1205, and 1207, respectively. Thus, some network devices are only within the reachability and directionality of router 1202, while some network devices are only within the reachability and directionality of router 1204, whereas the electronic device 320 of the user 310 is within the reachability and directionality of both routers.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments, and advantages are merely illustrative and are not considered elements or limitations of the appended claims except where explicitly recited in a claim(s).

The various embodiments disclosed herein may be implemented as a system, method, or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

I claim:

1. A system for monitoring an industrial network for a plant associated with the industrial network, the system comprising:

a physical model builder configured to assemble a model of the plant by acquiring digital representations associated with the plant, each digital representation corresponding to a physical network element associated with the plant;

a network model builder configured to assemble a model of the industrial network by identifying network connections between two or more of the digital representations;

a visualization module configured to create a virtualization of the industrial network based on the model of the plant and the model of the industrial network and present at least a portion of the virtualization of the industrial network on an electronic device; and a network operation monitor configured to acquire information regarding operation of a portion of the industrial network corresponding to the portion of the virtualization of the industrial network presented on the electronic device, and overlay the information on the portion of the virtualization of the industrial network in a graphical format;

wherein the visualization module is further configured to receive, via the electronic device, a user gesture for a digital representation in the portion of the virtualization of the industrial network presented on the electronic device, and perform a function for the digital representation corresponding to the user gesture, wherein the function performed for the digital representation corresponding to the user gesture includes presenting a network connection of the digital representation as a cross-sectional pipeline view, the cross-sectional pipeline view comprising:

a link graphical representation of a transverse cross-section of a pipeline that represents an available bandwidth of a link; and a plurality of stream graphical representations representing streams that utilize respective portions of the available bandwidth of the link, wherein the plurality of stream graphical presentations are presented as different pipes within the link graphical representation.

2. The system of claim 1, wherein the portion of the virtualization of the industrial network presented on the electronic device corresponds to a geolocation of the electronic device in the plant.

3. The system of claim 1, wherein the function performed for the digital representation is subsequently performed for a physical network element corresponding to the digital representation.

4. The system of claim 1, wherein the network operation monitor is further configured to identify network congestion between two or more machines of the industrial network, and the visualization module is further configured to overlay the network congestion on the virtualization of the industrial network in a graphical format.

5. The system of claim 4, wherein the visualization module is further configured to, while overlaying the network congestion on the virtualization of the industrial network, present to a user on the virtualization a course of action to mitigate or remedy the network congestion.

6. The system of claim 1, wherein the function performed for the digital representation corresponding to the user gesture includes one or more of:

presenting a datasheet for the physical network element corresponding to the digital representation;

presenting a real-world image of the physical network element corresponding to the digital representation;

presenting an internal view of the physical network element corresponding to the digital representation;

playing media with hookup instructions for the physical network element corresponding to the digital representation;

presenting an operational status of the digital representation;

configuring an operational parameter of the digital representation; and connecting/disconnecting the digital representation to/from another digital representation.

7. The system of claim 1, wherein each of the different pipes within the cross-sectional pipeline view has a size, shading, numbering, tagging, and/or color that corresponds to one or more aspects of a data stream corresponding to each pipe.

8. A method of monitoring an industrial network for a plant associated with the industrial network, the method comprising:

assembling a model of the plant by acquiring digital representations associated with the plant, each digital representation corresponding to a physical network element associated with the plant;

assembling a model of the industrial network by identifying network connections between two or more of the digital representations;

creating a virtualization of the industrial network based on the model of the plant and the model of the industrial network and presenting at least a portion of the virtualization of the industrial network on an electronic device;

acquiring information on operation of a portion of the industrial network corresponding to the portion of the virtualization of the industrial network presented on the electronic device, and overlaying the information on the portion of the virtualization of the industrial network presented on the electronic device in a graphical format; and receiving, via the electronic device, a user gesture for a digital representation in the portion of the virtualization of the industrial network presented on the electronic device, and performing a function for the digital representation corresponding to the user gesture, wherein the function performed for the digital representation corresponding to the user gesture includes presenting a network connection of the digital representation as a cross-sectional pipeline view, the cross-sectional pipeline view comprising:

a link graphical representation of a transverse cross-section of a pipeline that represents an available bandwidth of a link; and a plurality of stream graphical representations representing streams that utilize respective portions of the available bandwidth of the link, wherein the plurality of stream graphical presentations are presented as different pipes within the link graphical representation.

9. The method of claim 8, wherein the portion of the virtualization of the industrial network presented on the electronic device corresponds to a geolocation of the electronic device in the plant.

10. The method of claim 8, wherein the function performed for the digital representation is subsequently performed for a physical network element corresponding to the digital representation.

11. The method of claim 8, further comprising identifying degradations in the operation of the industrial network, and overlaying the degradations on the virtualization of the industrial network in a graphical format.

12. The method of claim 8, wherein the function performed for the digital representation corresponding to the user gesture includes one or more of:

presenting a datasheet for the physical network element corresponding to the digital representation;

presenting a real-world image of the physical network element corresponding to the digital representation;

presenting an internal view of the physical network element corresponding to the digital representation;

playing media with hookup instructions for the physical network element corresponding to the digital representation;

presenting an operational status of the digital representation;

configuring an operational parameter of the digital representation; and connecting/disconnecting the digital representation to/from another digital representation.

13. The method of claim 8, wherein each of the different pipes within the cross-sectional pipeline view has a size, shading, numbering, tagging, and/or color that corresponds to one or more aspects of a data stream corresponding to each pipe.

14. An electronic device for monitoring an industrial network for a plant associated with the industrial network, the electronic device comprising:

a processor;

a storage communicatively coupled to the processor and storing computer-readable instructions thereon that, when executed by the processor, cause the electronic device to:

present at least a portion of a virtualization of the industrial network based on a model of the plant and a model of the industrial network;

overlay information on operation of a portion of the industrial network corresponding to the portion of the virtualization of the industrial network presented; and receive a user gesture for a digital representation in the portion of the virtualization of the industrial network presented;

wherein a function corresponding to the user gesture is performed for the digital representation in response to receiving the user gesture, wherein the function includes presenting a network connection of the digital representation as a cross-sectional pipeline view, the cross-sectional pipeline view comprising:

a link graphical representation of a transverse cross-section of a pipeline that represents an available bandwidth of a link; and a plurality of stream graphical representations representing streams that utilize respective portions of the available bandwidth of the link, wherein the plurality of stream graphical presentations are presented as different pipes within the link graphical representation.

15. The electronic device of claim 14, wherein the portion of the virtualization of the industrial network presented corresponds to a geolocation of the electronic device in the plant.

16. The electronic device of claim 14, wherein the function performed for the digital representation is subsequently performed for a physical network element corresponding to the digital representation.

17. The electronic device of claim 14, wherein the computer-readable instructions further cause the processor to overlay on the virtualization of the industrial network in a graphical format degradations identified in the operation of the industrial network.

18. The electronic device of claim 14, wherein the function performed for the digital representation corresponding to the user gesture includes one or more of:

presenting a datasheet for a physical network element corresponding to the digital representation;

presenting a real-world image of a physical network element corresponding to the digital representation;

presenting an internal view of a physical network element corresponding to the digital representation;

playing media with hookup instructions for a physical network element corresponding to the digital representation;

presenting an operational status of the digital representation;

configuring an operational parameter of the digital representation; and connecting/disconnecting the digital representation to/from another digital representation.

19. The electronic device of claim 14, wherein each of the different pipes has a size, shading, numbering, tagging, and/or color that corresponds to one or more aspects of a data stream corresponding to each pipe, the one or more aspects of the data stream including priority level, unicast or multicast traffic type, redundancy or non-redundancy path type, data speed, data volume, active or inactive stream, or wired or wireless connections.

* * * * *